United States Patent
Yun et al.

(10) Patent No.: US 9,343,068 B2
(45) Date of Patent: May 17, 2016

(54) METHOD AND APPARATUS FOR CONTROLLING ACCESS TO APPLICATIONS HAVING DIFFERENT SECURITY LEVELS

(71) Applicant: QUALCOMM Incorporated, San Diego, CA (US)

(72) Inventors: Sungrack Yun, Seongnam (JP); Taesu Kim, Seongnam (KR); Jun-Cheol Cho, Seoul (KR); Min-Kyu Park, Seoul (KR); Kyu Woong Hwang, Taejon (KR)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 14/028,139

(22) Filed: Sep. 16, 2013

(65) Prior Publication Data

US 2015/0081295 A1    Mar. 19, 2015

(51) Int. Cl.
| | |
|---|---|
| G10L 17/04 | (2013.01) |
| G10L 17/20 | (2013.01) |
| G10L 17/00 | (2013.01) |
| G10L 17/24 | (2013.01) |
| G10L 17/26 | (2013.01) |
| G06F 21/32 | (2013.01) |
| H04L 29/06 | (2006.01) |

(52) U.S. Cl.
CPC ............ *G10L 17/20* (2013.01); *G06F 21/32* (2013.01); *G10L 17/005* (2013.01); *G10L 17/04* (2013.01); *G10L 17/24* (2013.01); *G10L 17/26* (2013.01); *H04L 63/0861* (2013.01); *H04L 63/105* (2013.01)

(58) Field of Classification Search
CPC ............... G10L 1015/0636; G10L 17/04
USPC ........................................................ 704/236
See application file for complete search history.

(56) References Cited

U.S. PATENT DOCUMENTS

| | | | |
|---|---|---|---|
| 4,837,830 A * | 6/1989 | Wrench, Jr. | G10L 17/00 704/238 |
| 5,805,674 A | 9/1998 | Anderson, Jr. | |
| 6,691,089 B1 | 2/2004 | Su et al. | |
| 7,039,951 B1 | 5/2006 | Chaudhari et al. | |
| 7,212,969 B1 | 5/2007 | Bennett | |
| 7,457,745 B2 * | 11/2008 | Kadambe | G10L 15/07 704/216 |
| 7,668,718 B2 * | 2/2010 | Kahn | G10L 15/063 704/270 |
| 8,775,187 B2 * | 7/2014 | Summerfield | G06F 21/32 704/273 |
| 9,042,867 B2 * | 5/2015 | Gomar | H04W 12/06 455/411 |
| 2003/0046083 A1 | 3/2003 | Devinney et al. | |
| 2004/0148526 A1 | 7/2004 | Sands et al. | |
| 2012/0245941 A1 | 9/2012 | Cheyer | |

FOREIGN PATENT DOCUMENTS

WO    0123982 A1    4/2001

OTHER PUBLICATIONS

International Search Report and Written Opinion—PCT/US2014/054352—ISA/EPO—Nov. 10, 2014, 9 pages.

* cited by examiner

*Primary Examiner* — Susan McFadden
(74) *Attorney, Agent, or Firm* — Toler Law Group, PC

(57) ABSTRACT

A method for controlling access to a plurality of applications in an electronic device includes receiving a voice command from a speaker for accessing a target application among the plurality of applications, and verifying whether the voice command is indicative of a user authorized to access the applications based on a speaker model of the authorized user. In this method, each application is associated with a security level having a threshold value. The method further includes updating the speaker model with the voice command if the voice command is verified to be indicative of the user, and adjusting at least one of the threshold values based on the updated speaker model.

50 Claims, 15 Drawing Sheets

METHOD AND APPARATUS FOR CONTROLLING ACCESS TO APPLICATIONS HAVING DIFFERENT SECURITY LEVELS

TECHNICAL FIELD

The present disclosure relates to accessing applications in electronic devices, and more specifically, to controlling access to applications in response to voice commands.

BACKGROUND

In recent years, electronic devices capable of running applications have become very popular among users. For example, electronic devices such as smartphones, tablet computers, and personal computers may include applications such as a messaging application, a contact application, a calendar application, a photo application, etc. In addition, users may search and download other applications (e.g., a banking application), from an application provider via the Internet. These applications provide the users with convenient access to a variety of functionalities and information.

The applications accessed by users often include personal or private information that the users may not want others to access. For example, entails in a messaging application (e.g., email application) may include information for personal or business use. Similarly, a banking application of a user may include or allow access to financial information of the user such as an account number and an account balance.

Given the confidential nature of information that may be accessed through applications, conventional electronic devices generally provide one or more security features to limit access to such applications. Such security features may require authentication of a user for accessing an application. For instance, the user may be required to input a personal code and allowed access to the application when the code is verified.

Some conventional electronic devices are also equipped with speech recognition capabilities. In such devices, an application may be accessed in response to a spoken command from a user. To prevent unauthorized access to the application, these devices may verify the authenticity of the spoken command based on voice characteristics of an authorized user. However, authentication of the authorized user in such devices may not be reliable since the voice characteristics of the authorized user may change over time or as a result of a condition of the user.

SUMMARY

The present disclosure relates to controlling access to applications having different security levels by updating a speaker model and adjusting threshold values associated with the security levels.

According to an aspect of the present disclosure, a method for controlling access to a plurality of applications in an electronic device is disclosed. The method includes receiving a voice command from a speaker for accessing a target application among the plurality of applications, and verifying whether the voice command is indicative of a user authorized to access the applications based on a speaker model of the authorized user. In this method, each application is associated with a security level having a threshold value. The method updates the speaker model with the voice command if the voice command is verified to be indicative of the user, and adjusts at least one of the threshold values based on the updated speaker model. This disclosure also describes apparatus, a device, a system, a combination of means, and a computer-readable medium relating to this method.

According to another aspect of the present disclosure, an electronic device for controlling access to a plurality of applications is disclosed. The electronic device includes a sound sensor configured to receive a voice command from a speaker for accessing a target application among the plurality of applications, and a storage unit configured to store the plurality of applications, a plurality of security levels, a plurality of threshold values, and a speaker model of a user authorized to access the applications. Each application is associated with a security level among the plurality of security levels having a threshold value among the plurality of threshold values. The electronic device also includes a speaker verification unit configured to verify whether the voice command is indicative of the authorized user based on the speaker model of the authorized user, and a database updating unit configured to update the speaker model with the voice command if the voice command is verified to be indicative of the user, and adjust at least one of the threshold values based on the updated speaker model.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the inventive aspects of this disclosure. However, it will be apparent to one of ordinary skill in the art that the inventive aspects of this disclosure may be practiced without these specific details. In other instances, well-known methods, procedures, systems, and components have not been described in detail so as not to unnecessarily obscure aspects of the various embodiments.

Figure 1:
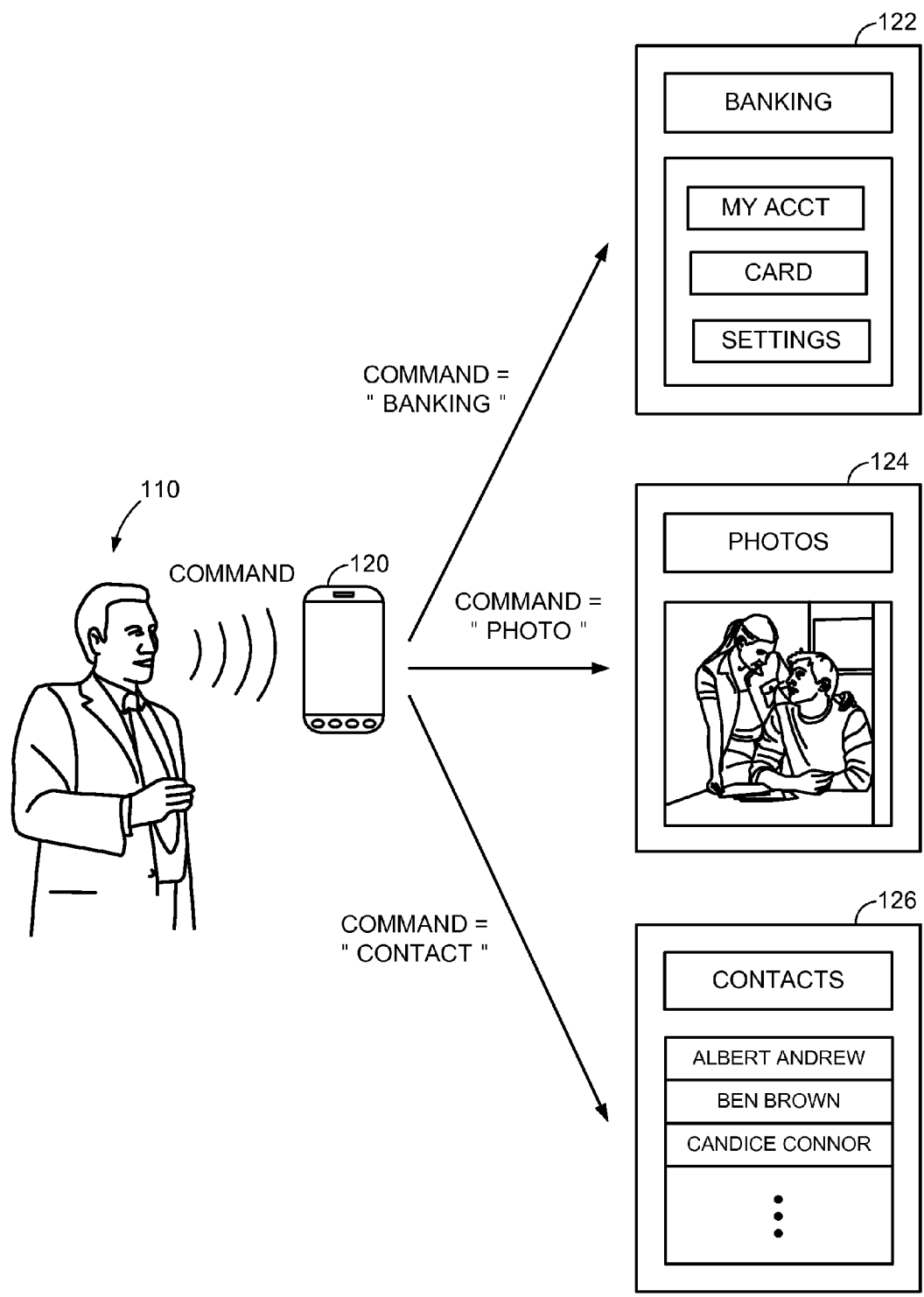
FIG. 1 illustrates a mobile device in which a plurality of applications can be accessed based on a plurality of security levels in response to a voice command of a speaker, according to one embodiment of the present disclosure.

FIG. 1 illustrates a mobile device 120 in which a plurality of applications 122, 124, and 126 can be accessed based on a plurality of security levels in response to a voice command of a speaker 110, according to one embodiment of the present disclosure. The mobile device 120 includes the applications 122, 124, and 126, which may be accessed in response to voice commands "BANKING," "PHOTO," and "CONTACT," respectively, from the speaker 110. Although the mobile device 120 is illustrated with the applications 122, 124, and 126, it may include any other applications for performing one or more functions. As used herein, the term "access" in the context of accessing an application refers to performing, executing, running, activating, or operating the application or a function in the application. Further, the term "voice command" refers to any digital or analog representation of one or more words uttered from a speaker indicating an action to be performed in the mobile device 120, and includes an instruction, a request, an order, a keyword, and the like.

Each of the applications 122, 124, and 126 in the mobile device 120 is configured with a security level for accessing the associated application. Each of the security levels for the applications 122, 124, and 126 is mapped to a threshold value indicating a minimum confidence value for accessing the associated application 122, 124, or 126. The mobile device 120 may access an application when a voice command from the speaker 110 is recognized and verified to be from an authorized user based on the threshold value associated with the application. According to some embodiments of the present disclosure, if an application requires a high level of security, a high security level, which is mapped to a high threshold value, may be assigned.

In the illustrated embodiment, the mobile device 120 is configured to allow the speaker 110 to access the applications 122, 124, and 126 as an authorized user in response to the associated voice commands from the speaker 110. As shown, the speaker 110 may speak a voice command as an input sound for accessing the application 122, 124, or 126 in the mobile device 120. When the mobile device 120 recognizes the voice command in the input sound as a command to access one of the applications 122, 124, and 126, it determines a confidence value of the voice command indicative of a likelihood that the voice command is that of the authorized user. If the confidence value of the voice command exceeds a threshold value associated with the application 122, 124, or 126, the mobile device 120 accesses the application 122, 124, or 126 associated with the voice command.

In FIG. 1, the mobile device 120 accesses the applications 122, 124, and 126 with different security levels in response to voice commands from the speaker 110. For example, the mobile device 120 may receive a voice command "BANKING" as an input sound from the speaker 110. The mobile device 120 may recognize the voice command as a command to access the banking application 122, which has a security level "1" indicating the highest security level. In this case, if a confidence value for the voice command is determined to be higher than a threshold value associated with the security level "1," the mobile device 120 verifies that the voice command is from the authorized user and accesses the banking application 122 for the speaker 110.

In another example, when the mobile device 120 receives a voice command "PHOTO" as an input sound, the mobile device 120 may recognize the voice command as a command for accessing the photo application 124, which has a security level "3" indicating an intermediate security level. In this case, if a confidence value for the voice command is determined to be higher than a threshold value associated with the security level "3," the mobile device 120 verifies that the voice command is from the authorized user and accesses the photo application 124.

In addition, if a received input sound includes a voice command "CONTACT," the mobile device 120 may recognize the voice command as a command to access the contact application 126, which is associated with a security level "5." For example, the security level "5" may indicate a lowest security level. In this case, if a confidence value for the voice command is determined to be higher than a threshold value associated with the security level "5," the mobile device 120 verifies that the voice command is from the authorized user and accesses the contact application 126.

Figure 2:
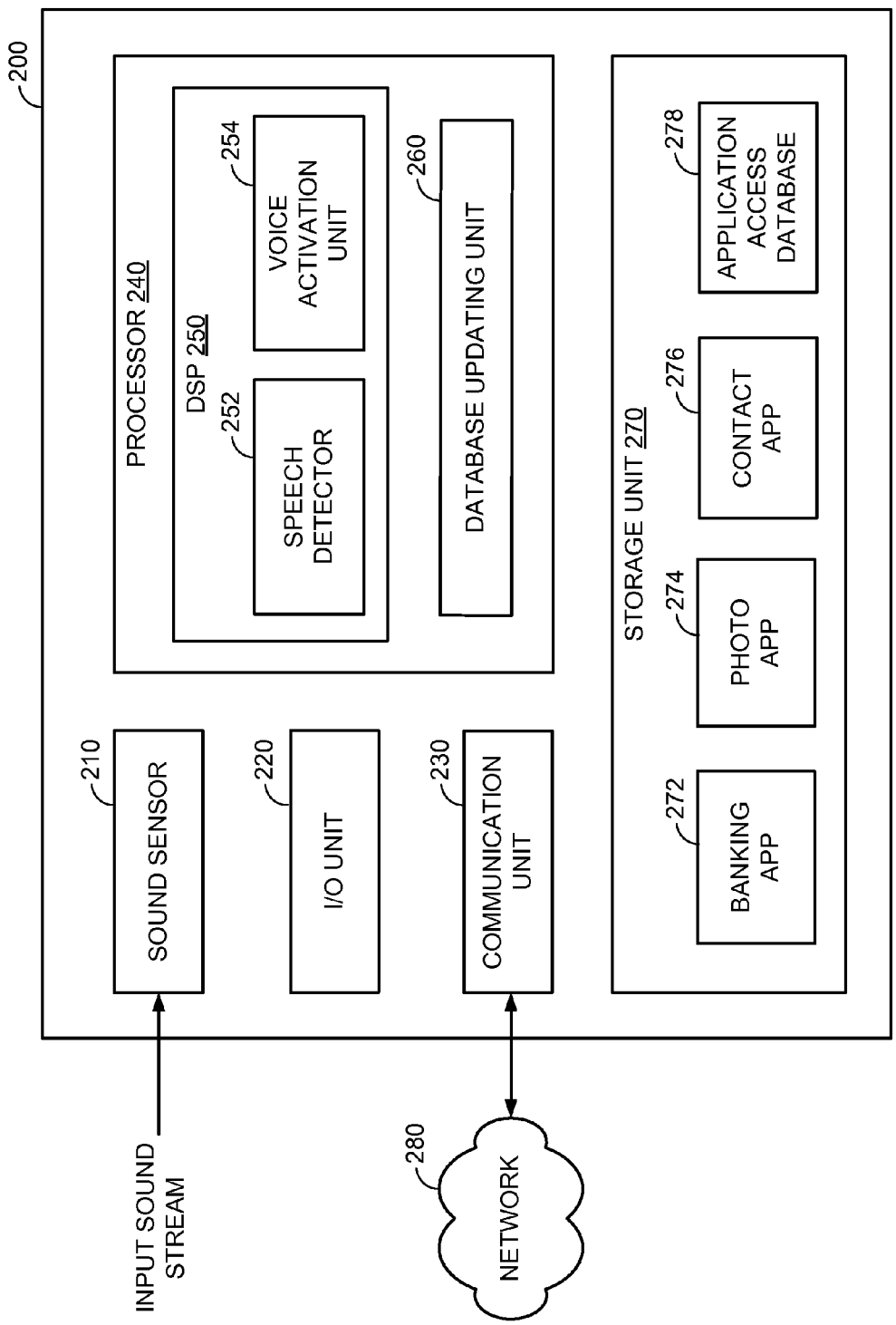
FIG. 2 illustrates a block diagram of an electronic device configured to control access to a plurality of applications by adjusting threshold values of security levels for the applications in response to a voice command of a speaker, according to one embodiment of the present disclosure.

FIG. 2 illustrates a block diagram of an electronic device 200 configured to control access to a plurality of applications by adjusting threshold values of security levels for the applications in response to a voice command of a speaker, according to one embodiment of the present disclosure. The electronic device 200 includes a sound sensor 210, an I/O unit 220, a communication unit 230, a processor 240, and a storage unit 270. The electronic device 200 may be any suitable device equipped with a sound capturing and processing capability such as a mobile device, which may include a cellular phone, a smartphone, a laptop computer, personal computer, a tablet computer, a gaming device and a multimedia device, a smart television, a personal computer, etc.

The processor 240 includes a digital signal processor (DSP) 250 and a database updating unit 260, and may be an application processor (AP) or a central processing unit (CPU) for managing and operating the electronic device 200. The DSP 250 includes a speech detector 252 and a voice activation unit 254. In one embodiment, the DSP 250 is a low power processor for reducing power consumption in processing an input sound stream. In this configuration, the voice activation unit 254 in the DSP 250 is configured to access an application such as a banking application 272, a photo application 274, and a contact application 276 stored in the storage unit 270 when a voice command in an input sound stream is recognized and verified.

The sound sensor 210 may be configured to receive an input sound stream and provide it to the speech detector 252 in the DSP 250. The sound sensor 210 may include one or more microphones or any other types of sound sensors that can be used to receive, capture, sense, and/or detect the input sound stream. In addition, the sound sensor 210 may employ any suitable software and/or hardware for performing such functions.

In one embodiment, the sound sensor 210 may be configured to receive the input sound stream periodically according to a duty cycle. In this case, the sound sensor 210 may determine whether the intensity of the received portion of the input sound stream is greater than a threshold intensity. When the intensity of the received portion exceeds the threshold intensity, the sound sensor 210 activates the speech detector 252 and provides the received portion to the speech detector 252 in the DSP 250. Alternatively, the sound sensor 210 may receive a portion of the input sound stream periodically and activate the speech detector 252 to provide the received portion to the speech detector 252 without determining whether the intensity of the received portion exceeds the threshold intensity. As used herein, the term "sound stream" refers to a sequence of one or more sound signals or sound data.

The speech detector 252 in the DSP 250 is configured to receive the portion of the input sound stream from the sound sensor 210. In one embodiment, the speech detector 252 may extract a plurality of sound features from the received portion and determine whether the extracted sound features are indicative of a sound of interest such as human speech by using any suitable sound classification method such as a Gaussian mixture model (GMM) based classifier, a neural network, a hidden Markov model (HMM), a graphical model, and a Support Vector Machine (SVM). If the received portion is determined to be a sound of interest, the speech detector 252 activates the voice activation unit 254 and the received portion and the remaining portion of the input sound stream are provided to the voice activation unit 254. In some other embodiments, the speech detector 252 may be omitted in the DSP 250. In this case, when the received input sound stream is greater in intensity than the threshold intensity, the sound sensor 210 activates the voice activation unit 254 and provides the received input sound stream directly to the voice activation unit 254.

For use in recognizing voice commands for accessing applications, the storage unit 270 stores a voice command (e.g., target keyword) for each of the applications along with state information on a plurality of states associated with a plurality of portions of the voice command. In one embodiment, the storage unit 270 may store speech or acoustic model for recognizing a voice command. The speech or acoustic model is a model representing speech characteristics of the voice command and may be a statistical model of such speech characteristics.

For the speech or acoustic model, the voice command may be divided into a plurality of basic sound units such as phones, phonemes, or subunits thereof. In this case, the plurality of portions representing the voice command may be generated based on the basic sound units. Each of the basic sound units of the voice command may be analyzed using any suitable speech recognition methods hidden Markov model (HMM), Gaussian mixture model (GMM) the semi-Markov model (SMM), or the like. Based on the analysis, a mean and a variance of each of the basic sound units may be determined. The determined means and variance for the basic sound units for the voice command are used to generate the speech or acoustic model for the voice command.

The storage unit 270 also stores the banking application 272, the photo application 274, and the contact application 276 that can be accessed by the processor 240. Although the storage unit 270 stores the banking application 272, the photo application 274, and the contact application 276 in the illustrated embodiment, it may also store any other applications or functions that can be executed by the processor 240. The storage unit 270 may be implemented using any suitable storage or memory devices such as a RAM (Random Access Memory), a ROM (Read-Only Memory), an EEPROM (Electrically Erasable Programmable Read-Only Memory), a flash memory, or an SSD (Solid State Drive).

In addition, the storage unit 270 may store an application access database 278 that is accessed by the voice activation unit 254 and the database updating unit 260. The application access database 278 includes information associating the voice commands to applications and security levels associated with the applications. Further, the application access database 278 may also include information for verifying an authorized user such as a speaker verification database and a speaker model.

The voice activation unit 254 in the DSP 250 is configured to receive the input sound stream starting from the portion received in the speech detector 252. A voice command for accessing an application may then be recognized from the input sound stream in the voice activation unit 254. For recognizing the voice command, one or more sound features (e.g., audio finger fingerprints, MFCC vectors) may be extracted from the received input sound stream and analyzed using any suitable speech recognition methods based on the hidden Markov model (HMM), the semi-Markov model (SMM), or the like.

Once the voice command is recognized, the voice activation unit 254 identifies an application to be accessed that is associated with the voice command, a security level associated with the application, and a threshold value associated with the security level based on the application access database 278 in the storage unit 270. For example, when a voice command "BANKING" is recognized, the voice activation unit 254 may identify the banking application 272, an associated security level (e.g., the security level "1"), and a threshold value for the security level (e.g., the threshold value "9") based on the application access database 278.

The voice activation unit 254 is also configured to determine a confidence value of the voice command based on the extracted sound features and the speaker model in the application access database 278. The speaker model is a model representing sound characteristics of a speaker and may be a statistical model of such sound characteristics. The confidence value of the voice command is then compared to the threshold value associated with the application to be accessed. If the confidence value exceeds the threshold value, the voice command is verified to be from the authorized user. In this case, the voice activation unit 254 generates an activation signal to access the application associated with the voice command. When the voice command has been verified, the voice activation unit 254 transmits the security level for the accessed application, the confidence value for the voice command, and the sound features for the voice command to the database updating unit 260. In one embodiment, the input sound stream for the voice command may be transmitted to the database updating unit 260 in addition to or instead of the sound features for the voice command.

Upon receiving the security level for the accessed application, the confidence value for the voice command, and the sound features of the voice command, the database updating unit 260 updates the speaker model in the storage unit 270. For example, the sound features of the voice command are added as a new sound sample to existing sound samples. In the case of a statistical speaker model, a new mean and a new variance of the sound samples for the speaker model may be determined based on the new sound sample and previous mean and variance of the existing sound samples. The database updating unit 260 then adjusts at least one of the threshold values for the security levels using the updated speaker model. The electronic device 200 may then use the updated speaker model and the adjusted threshold value to verify subsequent voice commands for accessing the applications 272, 274, and 276.

Figure 3:
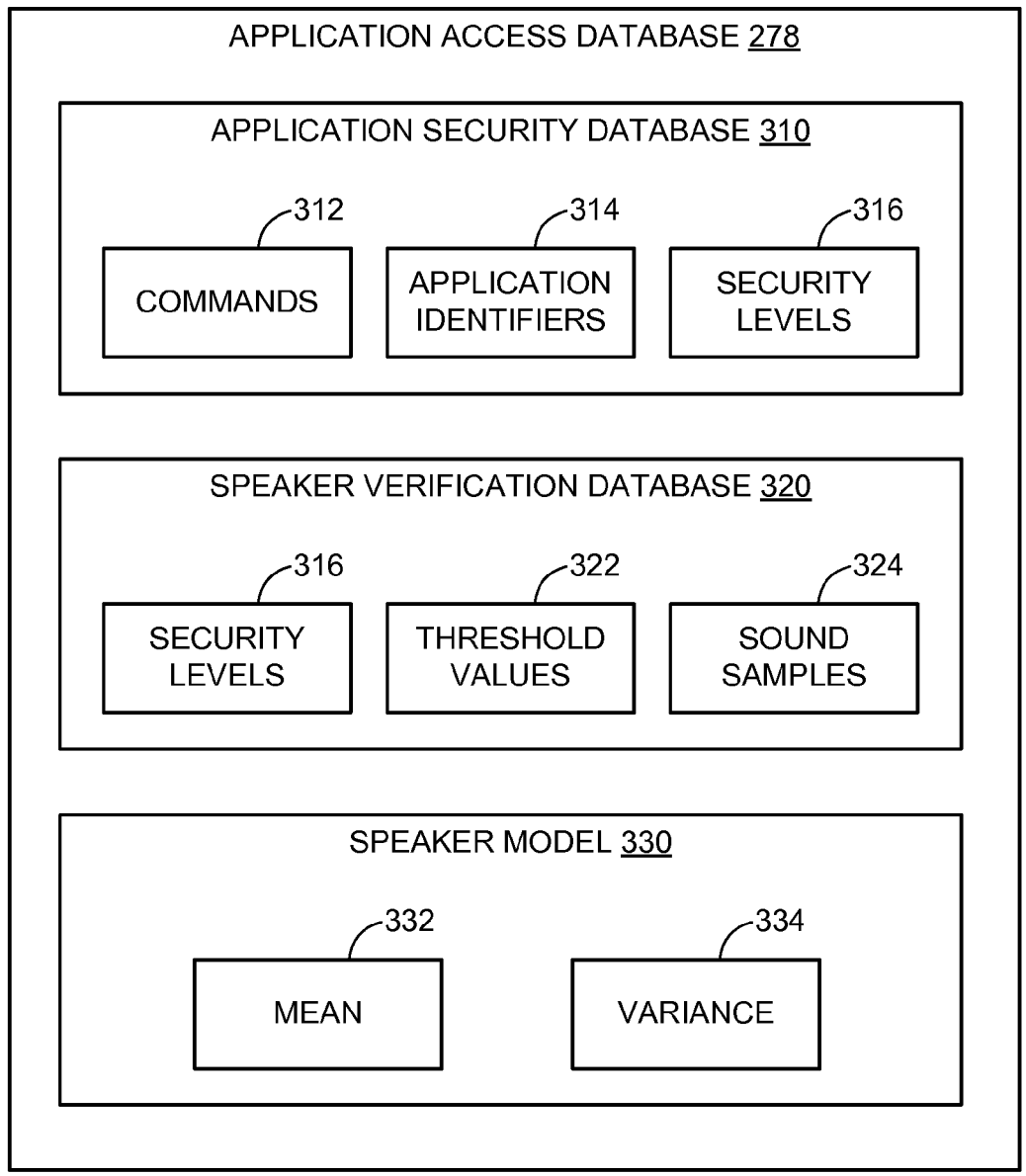
FIG. 3 shows a block diagram of an application access database in an electronic device for verifying a voice command from a speaker, according to one embodiment of the present disclosure.

FIG. 3 shows a block diagram of the application access database 278 for verifying a voice command from a speaker, according to one embodiment of the present disclosure. The application access database 278 includes an application security database 310, a speaker verification database 320, and a speaker model 330. The application security database 310 includes a plurality of commands 312, a plurality of application identifiers 314, and a plurality of security levels 316. The speaker verification database 320 includes the plurality of security levels 316, a plurality of threshold values 322, and a plurality of sound samples 324.

The application security database 310 maps the commands 312 to the application identifiers 314 indicative of applications to be accessed. The application identifiers 314 are associated with the security levels 316 for determining security levels for the applications to be accessed. In one embodiment, the commands 312, the application identifiers 314, and the security levels 316 may be stored in a form of a lookup table or any suitable data structure for determining the application identifiers 314 and the security levels 316 in response to the commands 312. Using the application security database 310, the voice activation unit 254 determines a security level of an application to be accessed when a voice command is recognized as one of the commands 312.

In the speaker verification database 320, the security levels 316 are mapped to the threshold values 322 indicating minimum values that confidence values of recognized voice commands need to exceed for accessing the applications associated with the security levels 316. In one embodiment, a security level is mapped to a threshold value indicative of a minimum confidence value for the security level. The sound samples 324 of the speaker are assigned to the security levels 316 in the speaker verification database 320 according to the threshold values 322 of the security levels 316. The speaker verification database 320 including the security levels 316, the threshold values 322, and sound samples 324 may be stored in a form of a lookup table or any suitable data structure.

The speaker model 330 in the application access database 278 is used to calculate a confidence value of the voice command for use in verifying the voice command of the speaker. The speaker model 330 may be a GMM model including statistical data such as a mean 332 and a variance 334 for the sound samples 324. In other embodiments, the speaker model 330 may also include a maximum value, a minimum value, a noise power, an SNR, a signal power, an entropy, a kurtosis, a high order momentum, etc. of the sound samples 324. The voice activation unit 254 compares the confidence value of the voice command and the threshold value of the security level for the application to be accessed. If the confidence value of the voice command exceeds the threshold value of the application, the voice activation unit 254 verifies the voice command to be from the authorized user, and generates an activation signal for accessing the application.

Figure 4:
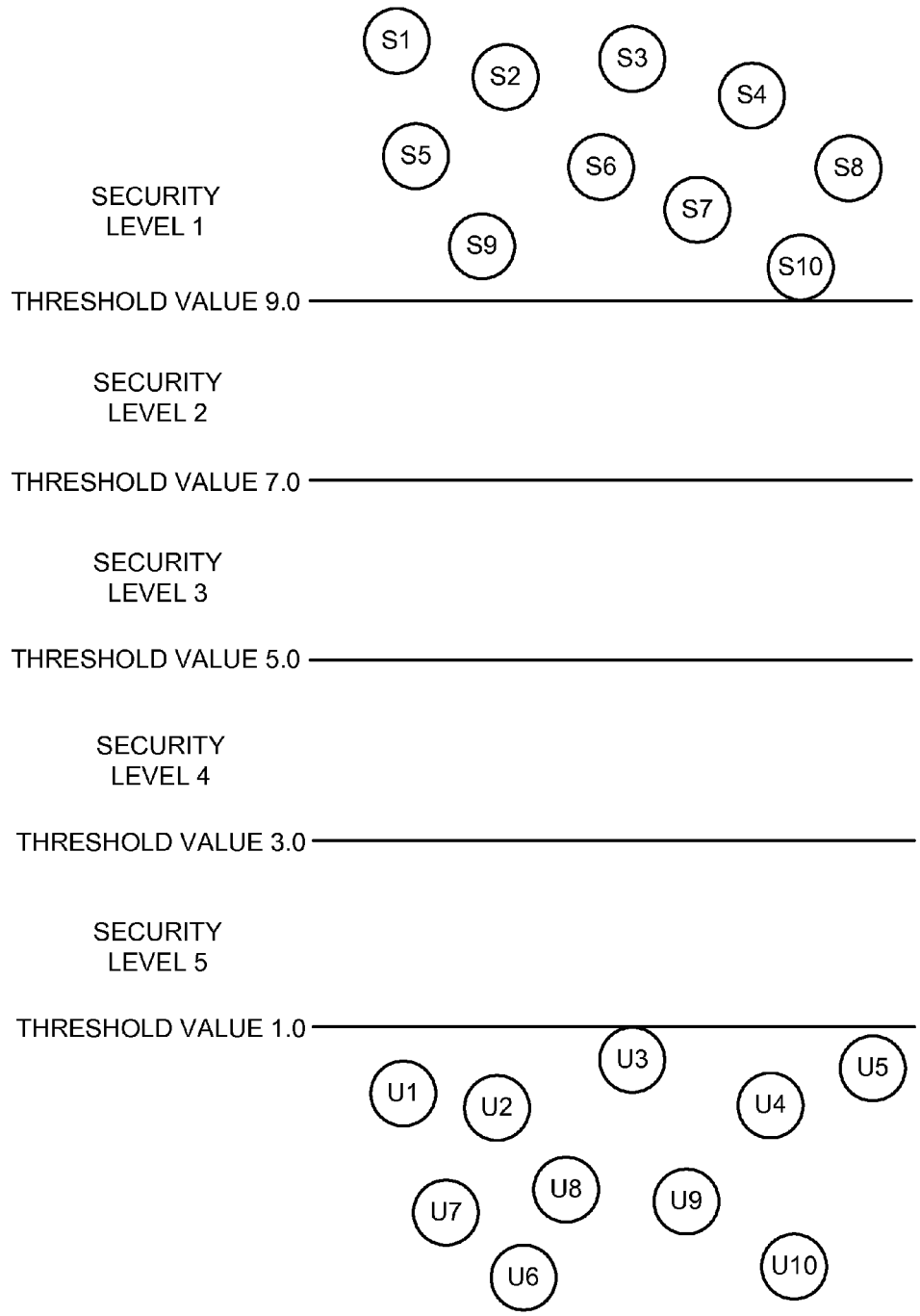
FIG. 4 illustrates a diagram of setting up a speaker verification database in an electronic device, including initial threshold values for a plurality of security levels, based on sound samples of a speaker and an unauthorized speaker, according to one embodiment of the present disclosure.

FIG. 4 illustrates a diagram of setting up the speaker verification database 320, including initial threshold values for a plurality of security levels, based on sound samples of an authorized user and an unauthorized user, according to one embodiment of the present disclosure. As shown, the speaker verification database 320 includes five security levels "1" to "5" with security level "1" being the highest security level. Each application in the mobile device 120 may be assigned with one of the security levels for access. Although the speaker verification database 320 is illustrated with five security levels, it may include any suitable number of security levels.

For setting up the speaker verification database 320, the electronic device 200 receives and stores a plurality of sound samples S1 to S10 from a speaker as an authorized user and a plurality of sound samples U1 to U10 from an unauthorized user (i.e., an imposter). As discussed above, the sound samples S1 to S10 of the authorized user are used to generate a speaker model using statistical data (e.g., a mean and a variance) of the sound samples. Confidence values of the sound samples S1 to S10 and the sound samples U1 to U10 are then determined based on the speaker model. In this case, the confidence values of the sound samples for the authorized user will generally be substantially higher than the confidence values of the sound samples for the unauthorized user.

After confidence values of the sound samples S1 to S10 and U1 to U10 have been determined, a highest threshold value and a lowest threshold value are selected among the confidence values. The electronic device 200 may determine a highest threshold value to be a minimum value among the confidence values of the sound samples S1 to S10 for the authorized user. The highest threshold value is then mapped to the highest security level "1." On the other hand, the electronic device 200 may determine a lowest threshold value to be a maximum value among the confidence values of the sound samples U1 to U10 for the unauthorized user. In this case, the lowest threshold value is mapped to the lowest security level "5."

The interval between the highest and lowest threshold values, which correspond to the highest security level "1" and the lowest security level "5," respectively, may then be partitioned or divided to determine threshold values for the intermediate security levels "2," "3," and "4" between the security levels "1" and "5." In one embodiment, the electronic device 200 determines the threshold values for the security levels "2," "3," and "4" by equally partitioning the difference between the highest threshold value and the lowest threshold value. In this case, the difference may be divided by 4 (i.e., the number of intermediate security levels plus 1) to calculate a threshold value increment. One or more threshold value increments may then be added to the lowest threshold value to determine the threshold values for the intermediate security levels "2," "3," and "4." Alternatively, one or more threshold value increments may be subtracted from the highest threshold value to determine the threshold values for the intermediate security levels "2," "3," and "4." In this manner, each of the security levels may be incrementally defined by its associated threshold value indicative of a minimum confidence value for the security level.

Figure 5:
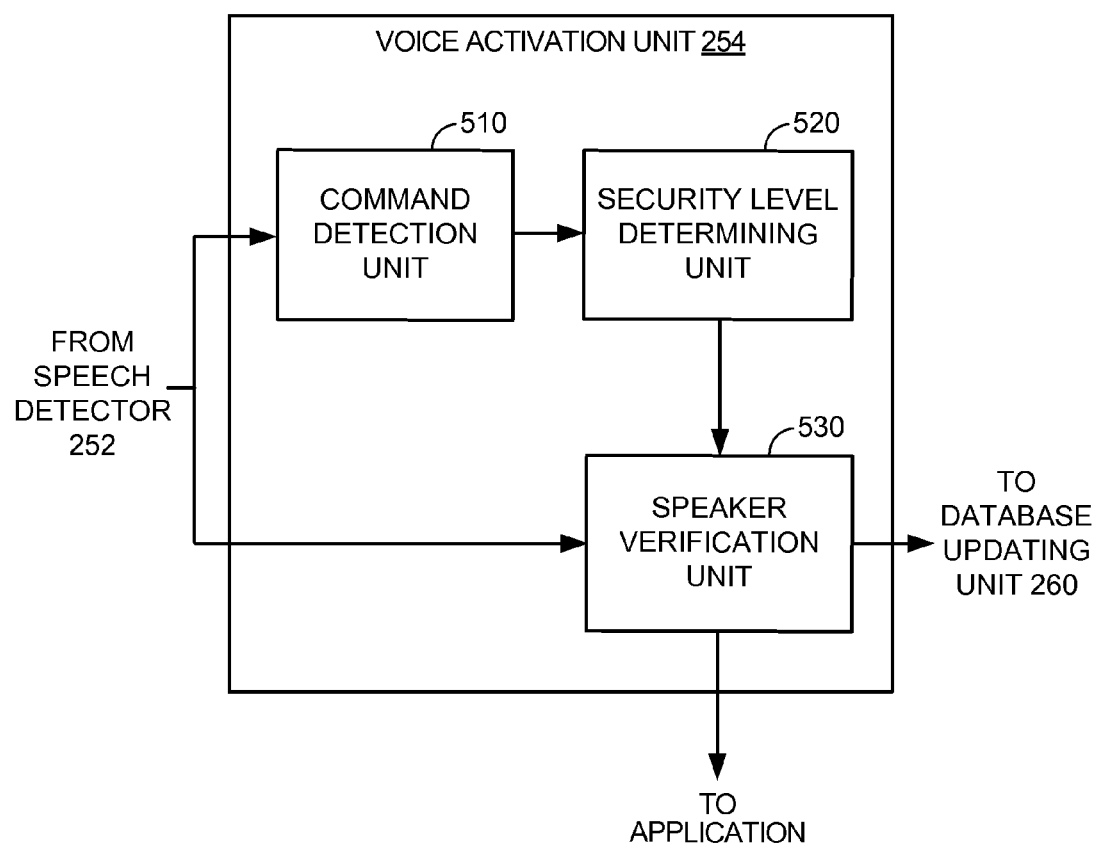
FIG. 5 illustrates a block diagram of a voice activation unit in an electronic device configured to access an application when a voice command from a speaker is verified, according to one embodiment of the present disclosure.

FIG. 5 illustrates a block diagram of the voice activation unit 254 configured to access an application when a voice command from a speaker is verified, according to one embodiment of the present disclosure. The voice activation unit 254 includes a command detection unit 510, a security level determining unit 520, and a speaker verification unit 530. The command detection unit 510 recognizes a voice command to access an application from an input sound stream and the security level determining unit 520 determines a security level for the application. The speaker verification unit 530 then accesses the application if the voice command is verified to be from an authorized user.

In the voice activation unit 254, the command detection unit 510 is configured to receive an input sound stream from the speech detector 252 and recognize a voice command for accessing an application from the input sound stream. For recognizing the voice command, the command detection unit 510 extracts one or more sound features (e.g., audio finger fingerprints, MFCC vectors) from the received input sound stream. The extracted sound features are then analyzed using any suitable speech recognition methods based on the HMM, the SMM, or the like to recognize the voice command. In one embodiment, the command detection unit 510 may divide the input sound stream into a plurality of basic sound unit such as phonemes, and then access the speech or acoustic model for the voice command stored in the storage unit 270 to recognize the voice command. If the voice command is recognized, the command detection unit 510 transmits the recognized voice command to the security level determining unit 520. In one embodiment, the extracted sound features may be transmitted to the speaker verification unit 530 for use in verifying the voice command.

The security level determining unit 520 receives the voice command and identifies the application to be accessed based on the recognized voice command. In one embodiment, a plurality of commands, application identifiers associated with the voice commands, and security levels for the applications are stored in the application security database 310 of the storage unit 270. Based on the voice command, the security level determining unit 520 identifies the application to be accessed from the application security database 310. The security level determining unit 520 may also determine a security level associated with the application to be accessed from the application security database 310. An application identifier for accessing the application and its security level are then transmitted to the speaker verification unit 530.

The speaker verification unit 530 is configured to receive the input sound stream and the application identifier with its security level and verify whether the voice command is from a user authorized to access the application. The speaker verification unit 530 may determine a confidence value of the voice command in the input sound stream based on the speaker model 330 and sound features extracted from the input sound stream. In this case, the speaker verification unit 530 may extract the sound features from the input sound stream or use the extracted sound features received from the command detection unit 510. In one embodiment, a confidence value for each of the sound features may be calculated based on the speaker model 330 and an average of the confidence values of the sound features may be used as the confidence value for the voice command.

The speaker verification unit 530 is also configured to obtain a threshold value for the security level of the application identifier from the speaker verification database 320 in the storage unit 270. The speaker verification unit 530 then compares the threshold value and the confidence value of the voice command to determine if the confidence value exceeds the threshold value. If the confidence value does not exceed the threshold value, the voice command is not verified to be from the authorized user. In this case, the speaker verification unit 530 may receive additional input from the speaker to further authenticate the voice command for accessing the application. If the speaker is not verified, the application is not accessed.

On the other hand, if the confidence value of the voice command exceeds the threshold value, the voice command is verified to be from the authorized user. The speaker verification unit 530 then generates an activation signal to access the application identified in response to the voice command Additionally, the speaker verification unit 530 transmits the security level for the accessed application, the confidence value for the voice command, and the sound features as a new sound sample for the voice command to the database updating unit 260.

Figure 6:
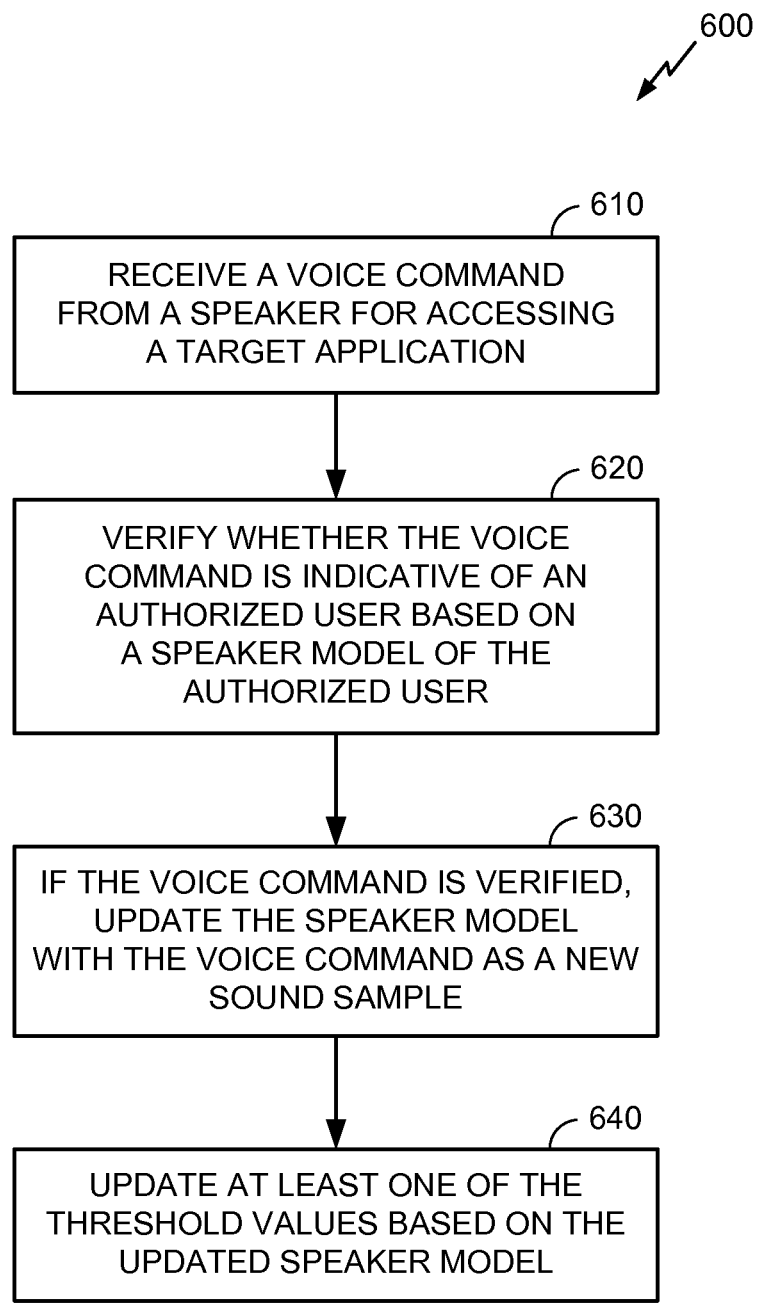
FIG. 6 shows is a flow chart of a method for providing access to an application and adjusting access for the application based on a voice command in an electronic device, according to one embodiment of the present disclosure.

FIG. 6 shows is a flow chart of a method 600 for controlling access for applications based on a voice command in the electronic device 200 according to one embodiment of the present disclosure. The electronic device 200 is provided with a plurality of applications. Each of the applications is associated with a security level, which has a minimum confidence value as a threshold value to access the application.

At 610, an input sound stream including a voice command from a speaker for accessing a target application among the plurality of applications is received. Once the voice command is recognized as a command to access the target application, it is then verified whether the voice command is indicative of an authorized user based on the speaker model 330 of the authorized user, at 620. If the voice command is verified, an activation signal for accessing the target application is generated, and the target application is accessed. In addition, if the voice command is verified, the speaker model 330 is updated with the voice command as a new sound sample, at 630. Based on the updated speaker model, at least one of the threshold values for the security levels is adjusted, at 640. Accordingly, the electronic device 200 may use the updated speaker model and the adjusted threshold values to verify subsequent voice commands for accessing the applications.

Figure 7:
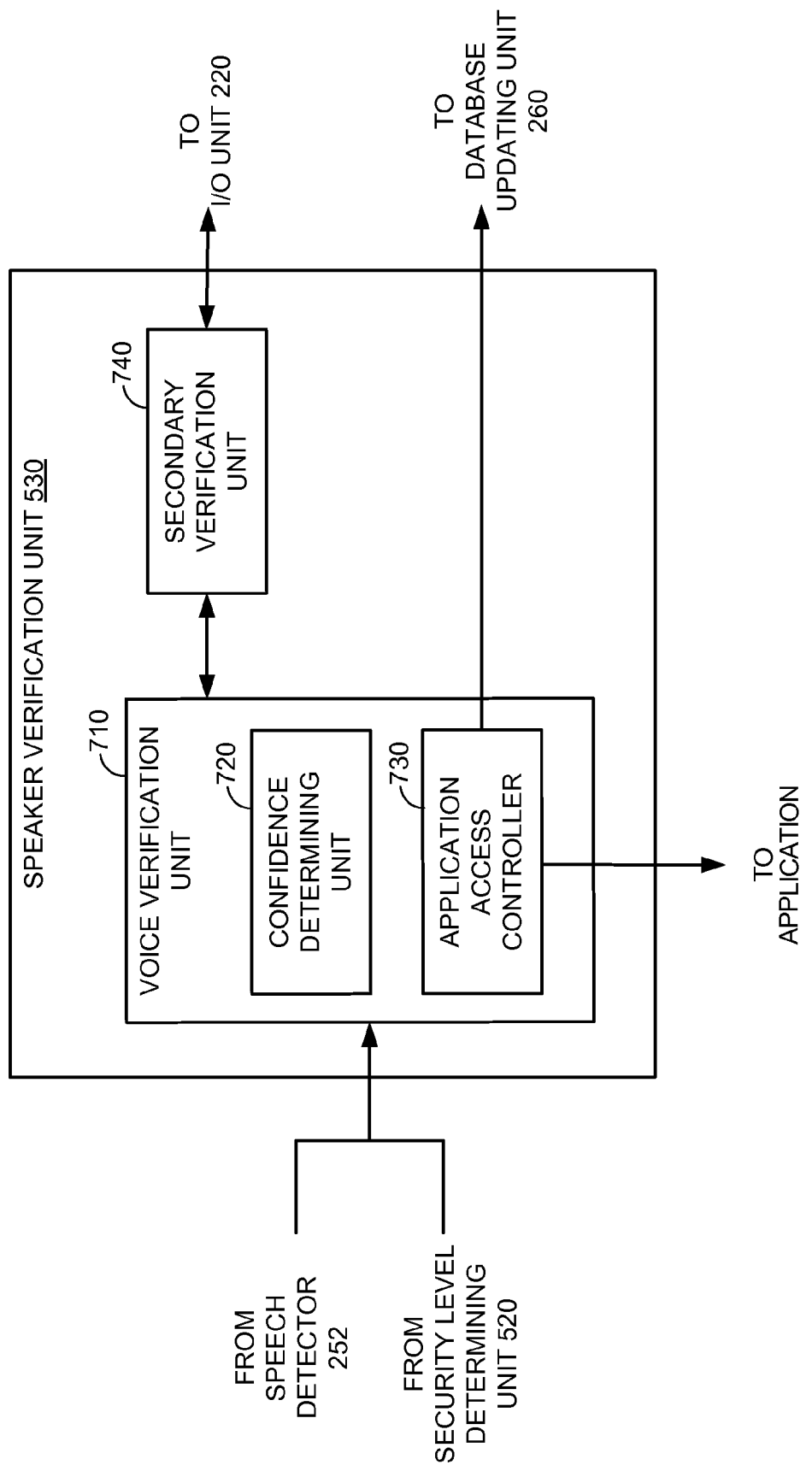
FIG. 7 is a block diagram of a speaker verification unit in an electronic device configured to access an application by verifying a voice command from a speaker, according to one embodiment of the present disclosure.

FIG. 7 is a block diagram of the speaker verification unit 530 configured to access an application by verifying a voice command from a speaker, according to one embodiment of the present disclosure. The speaker verification unit 530 includes a voice verification unit 710 and a secondary verification unit 740. The voice verification unit 710 further includes a confidence determining unit 720 and an application access controller 730.

The voice verification unit 710 receives an application identifier which indicates the application to be accessed and a security level of the application from the security level determining unit 520. In addition, the voice verification unit 710 receives an input sound stream from the speech detector 252 and may extract sounds features from the input sound stream. Alternatively, the voice verification unit 710 may receive extracted sound features from the command detection unit 510. The confidence determining unit 720 then determines a confidence value of the voice command based on the extracted sound features and the speaker model 330 from the storage unit 270. The confidence value of the voice command is then transmitted to the application access controller 730.

The confidence determining unit 720 determines a confidence value of the voice command. In one embodiment, the confidence determining unit 720 may calculate a confidence value for each of the sound features based on the speaker model 330 and an average of the confidence values of the sound features. In this case, the average confidence value may be used as the confidence value for the voice command. For example, when the speaker model 330 is a GMM model including a mean and a variance, the confidence determining unit 720 calculates a likelihood that a sound feature belongs to the GMM model as a confidence value. The confidence values for the sound features of the voice command may then be averaged to generate an average confidence value for the sound features. In other embodiments, the confidence determining unit 720 may use any other suitable algorithms for determining a confidence value of a voice command such as hidden Markov models, pattern matching algorithms, neural networks, Vector Quantization and decision trees, anti-speaker techniques (e.g., universal background model), etc.

From the speaker verification database 320, the application access controller 730 obtains a threshold value of the security level for the application to be accessed. The threshold value of the security level and the confidence value of the voice command are then compared. If the confidence value exceeds the threshold value of the security level, the voice command is verified to be from the authorized user. In this case, the application access controller 730 generates an activation signal for accessing the application. Additionally, the confidence value, the security level of the application, and the sound features as a new sound sample are transmitted to the database updating unit 260 to update the speaker model 330 and adjust at least one of threshold values for the security levels.

On the other hand, if the confidence value of the input sound does not exceed the threshold value of the security level, the voice verification unit 710 notifies the secondary verification unit 740 to receive an additional input from the speaker to verify that the voice command is from the authorized user. The secondary verification unit 740 may then request the speaker to provide via the I/O unit 220 one or more inputs such as an additional voice sample, a password, a biometric scan including an iris scan, a fingerprint scan, a facial scan, etc.

Once the input is received from the speaker, the secondary verification unit 740 is configured to determine whether the additional input is from the authorized user. For example, if the secondary verification unit 740 requests a password for verification, the speaker may input the password via a keypad in the I/O unit 220. When the input password is the same as a password of the authorized user stored in the storage unit 270, the secondary verification unit 740 notifies the application access controller 730 that the speaker of the voice command is verified to be the authorized user. In another example, when an additional voice sample is received, it may be transmitted to the voice verification unit 710 to verify that the additional voice sample is from the authorized user.

Based on the additional speaker verification, the secondary verification unit 740 may verify that the initially unverified voice command is from the user who is authorized to access the application. If the speaker of the voice command is verified based on the additional speaker verification, the secondary verification unit 740 notifies the voice verification unit 710 that the speaker of the voice command is verified. In response, the application access controller 730 generates an activation signal for accessing the application. Additionally, the application access controller 730 transmits the confidence value, the security level of the application, and the sound features of the voice command as a new sound sample to the database updating unit 260.

Figure 8:
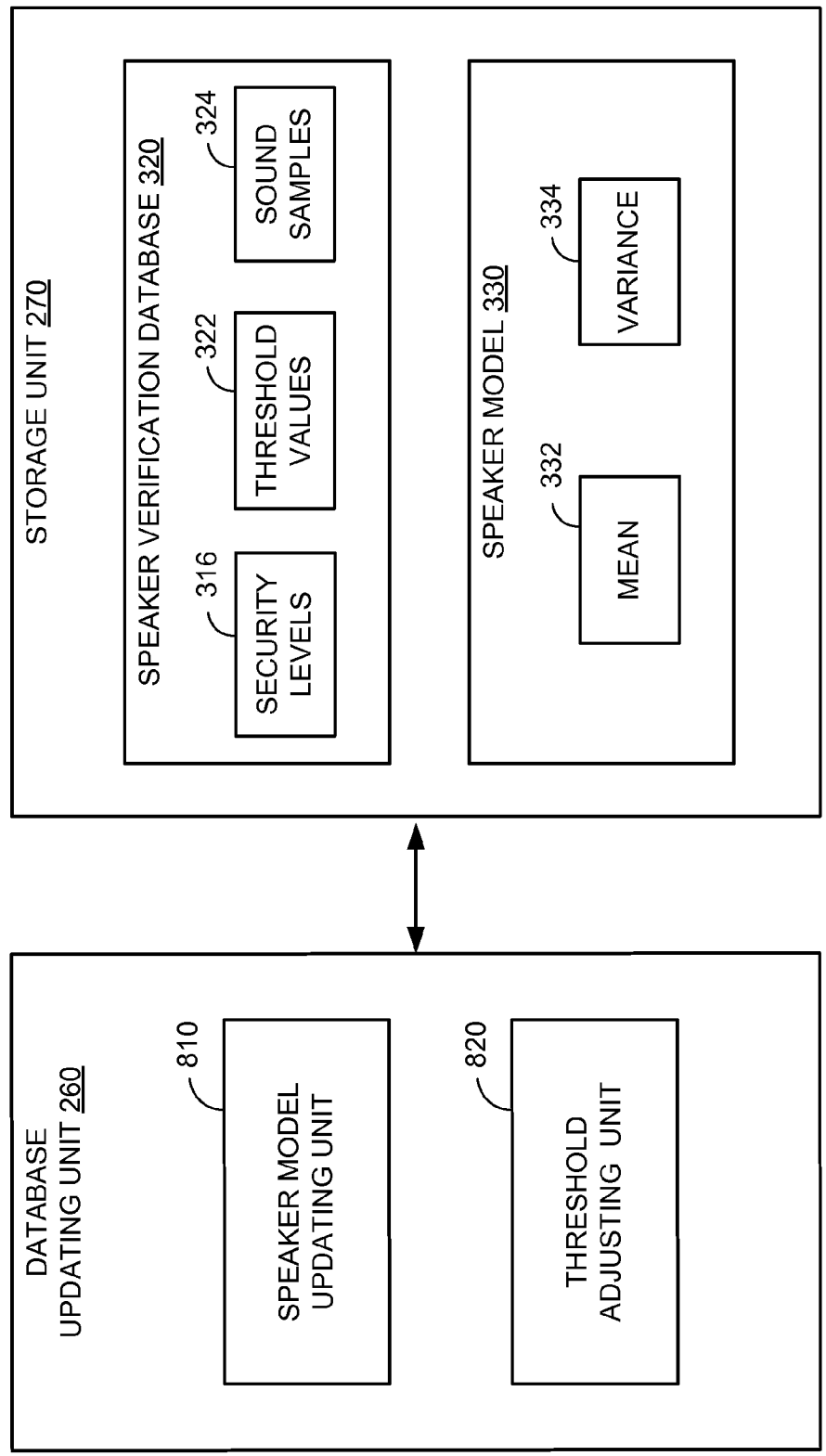
FIG. 8 illustrates a block diagram of a database updating unit in an electronic device configured to update a speaker model and adjust threshold values for security levels based on a verified voice command, according to one embodiment of the present disclosure.

FIG. 8 illustrates a block diagram of the database updating unit 260 configured to update the speaker model 330 and adjust the threshold values 322 for the security levels 316 based on a verified voice command, according to one embodiment of the present disclosure. When the speaker model 330 has been updated and the threshold values 322 for the security levels 316 have been adjusted in response to the verified voice command, they may be used to verify subsequent voice commands for accessing the applications. The database updating unit 260 includes a speaker model updating unit 810 and a threshold adjusting unit 820.

The speaker model updating unit 810 is configured to receive a new sound sample for the verified voice command and a confidence value determined for the new sound sample. The speaker model updating unit 810 then updates the sound samples 324 of the speaker verification database 320 by adding the new sound sample. In one embodiment, the sound samples 324 are mapped to associated security levels 316 based on their confidence values. For example, if a confidence value associated with the new sound sample is 9.1 and the threshold value of the security level "1" is 9.0, the new sound sample is mapped to the security level "1."

As illustrated, the speaker model updating unit 810 updates the speaker model 330 by determining a new mean and a new variance based on the mean 332 and the variance 334 and the confidence value of the new sound sample. Alternatively, the speaker model updating unit 810 may use the updated sound samples 324 to determine a new mean and a new variance for the speaker model 330. In determining the new mean and variance of the speaker model 330, the new sound sample may be weighted according to its confidence value. For example, if the confidence value of the new sound sample is low, the new sound sample may be given a low weight in calculating the new mean and variance of the speaker model 330. On the other hand, if the confidence value of the new sound sample is high, the new sound sample may be given a high weight in calculating the new mean and variance of the speaker model 330.

In some embodiments, the mean 332 and the variance 334 of the speaker model 330 may be updated by using Maximum a posteriori (MAP) adaptation technique. In this case, the mean 332 and/or the variance 334 is updated by performing a linear combination of a previous mean and/or variance and a new mean and/or variance which is computed using the new sound sample. Each of the previous mean and/or variance and the new mean and/or variance is differently weighted based on the confidence value of the new sound sample. For example, if the confidence value of the new sound sample is high, a large coefficient value for the new mean may be used when performing the linear combination. Using the new sound sample, the mean 332 and variance 334 of the speaker model 330 may then be updated. The speaker model updating unit 810 also notifies the threshold adjusting unit 820 that the speaker model 330 is updated.

The threshold adjusting unit 820 is configured to receive the update notification from the speaker model updating unit 810. The threshold adjusting unit 820 then accesses the updated speaker model 330 to re-calculate confidence values for the updated sound samples 324. In one embodiment, the threshold adjusting unit 820 may re-calculate confidence values for the sound samples associated with the security level of the accessed application. The re-calculated confidence values may then be used to determine a new threshold value for the security level of the accessed application. For example, the new threshold value may be the minimum confidence value among the re-calculated confidence values. Thus, if the minimum confidence value is different from the previous threshold value for the security level, the threshold value may be adjusted to the minimum confidence value among the re-calculated confidence values.

Alternatively, the threshold adjusting unit 820 may re-calculate confidence values for the sound samples 324 in the speaker verification database 320. In this case, the threshold values 322 for the security levels 316 in the speaker verification database 320 may be adjusted to reflect any new minimum confidence values for the security levels 316. In another embodiment, the threshold adjusting unit 820 may re-calculate confidence values for sound samples 324 associated with a security level, to which the new sound sample is mapped. The threshold value for this security level will be adjusted to be the minimum confidence value among the re-calculated confidence values for the sound samples associated with the security level.

Figure 9:
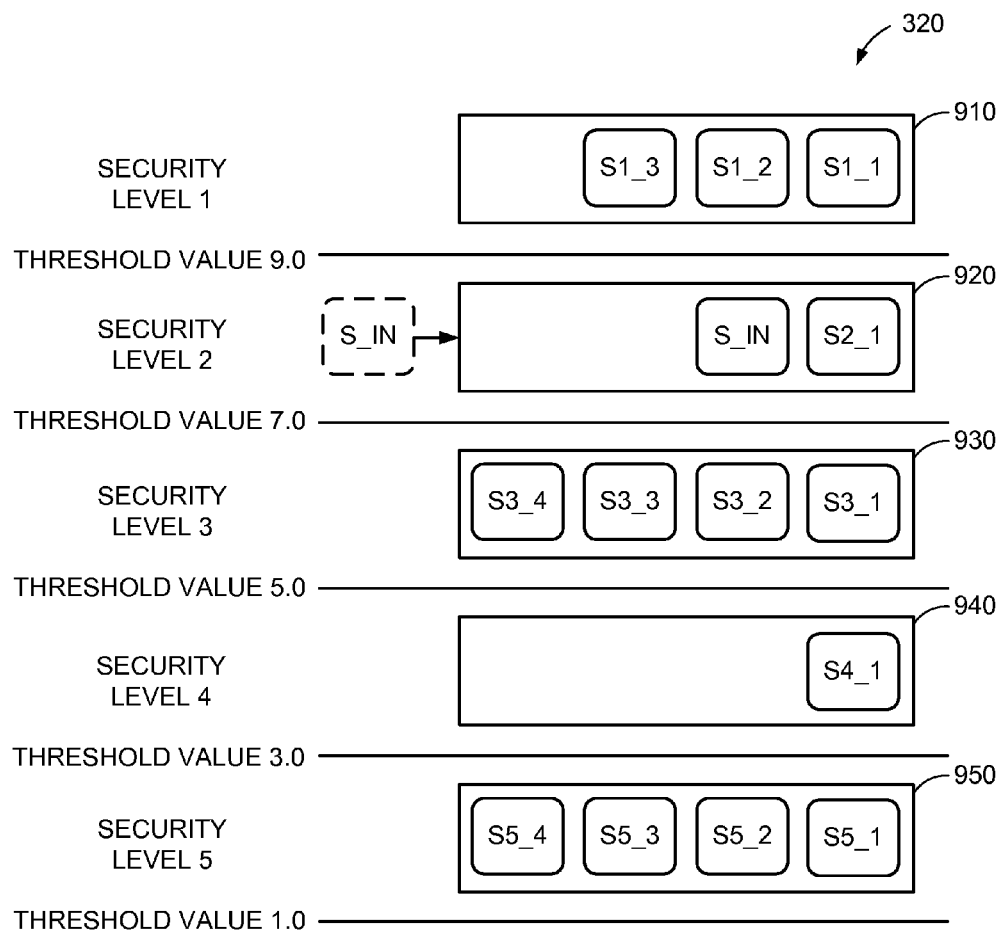
FIG. 9 illustrates a diagram of a speaker verification database in an electronic device that may be updated with a new sound sample for a verified voice command, according to one embodiment of the present disclosure.

FIG. 9 illustrates a diagram of the speaker verification database 320 that may be updated with a new sound sample for a verified voice command, according to one embodiment of the present disclosure. The speaker verification database 320 includes five security levels "1" to "5," which are associated with threshold values 9.0, 7.0, 5.0, 3.0, and 1.0, respectively. Each of the threshold values indicates a minimum confidence value for the associated security level. The security levels "1" to "5" are also associated with sound sample groups 910, 920, 930, 940, and 950, respectively. Each of the sound sample groups 910, 920, 930, 940, and 950 may be implemented in the form of a queue, a buffer, or the like using a FIFO (first-in first-out) data structure and may include a set of sound samples from 0 to a predetermined number.

In the illustrated speaker verification database 320, each of the sound sample groups 910, 920, 930, 940, and 950 may include up to four sound samples, but it may also include any suitable number of sound samples. In the example of FIG. 9, the sound sample groups 910, 920, 930, 940, and 950 includes sound samples for previously verified voice commands after the initial set-up of the speaker verification database 320. As subsequent voice commands from the speaker are additionally verified, the sound features for the verified commands may be added as new sound samples to the speaker verification database 320.

The sound samples are assigned to the sound sample groups 910 to 950 based on their confidence values and the threshold values for the security levels "1" to "5." For example, a confidence value of a sound sample may be compared with threshold values for the security levels "1" to "5" to determine one or more security levels having threshold values less than the confidence value of the sound sample. The sound sample is then assigned to a sound sample group associated with a security level having the highest threshold value among the determined threshold values. For example, if a confidence value of a sound sample S3_2 is 6.3, the threshold values 5.0, 3.0, and 1.0 are determined to be less than the confidence value 6.3. The sound sample S3_2 is then assigned to the sound sample group 930 which is associated with the security level "3" having the highest threshold value 5.0 among the determined threshold values 5.0, 3.0, and 1.0.

Initially, as shown in FIG. 4, the security levels and their initial threshold values are determined based on the sound samples of the authorized user and an unauthorized user. As voice commands are received and verified, the speaker verification database 320 then assigns sound samples for the verified voice commands to the sound sample groups 910, 920, 930, 940, and 950 based on their confidence values. In the speaker verification database 320, the sound sample groups 910, 920, 930, 940, and 950 include three sound samples (e.g., S1_1, S1_2, and S1_3), two sound samples (e.g., S2_1 and S2_2), four sound samples (e.g., S3_1, S3_2, S3_3, and S3_4), one sound sample (e.g., S4_1), and four sound samples (e.g., S5_1, S5_2, S5_3, and S5_4), respectively.

When a new sound sample and its confidence value for a verified voice command is received, a sound sample group is determined based on the confidence value of the new sound sample. The new sound sample will then be added to the determined sound sample group. For example, if a new sound sample S_IN with a confidence value of 8.2 is received, the new sound sample is added to the sound sample group 920 of the security level "2" with the threshold value of 7.0. If a sound sample group is full as in the cases of sound sample groups 930 and 950, an existing sound sample may be removed for adding a new sound sample. In such an event, existing sound samples may be removed on a first-in and first-out basis. For instance, when a new sound sample (e.g., S3_5) is to be added to the sound sample group 930 having a maximum of four sound samples S3_1 to S3_4, the first sound sample S3_1 may be removed and the new sound sample may be added to the sound sample group 930.

After the sound samples in the speaker verification database 320 has been updated, the database updating unit 260 may update the statistical data of the speaker model 330. In one embodiment, the speaker model 330 may be updated with the confidence value of a newly added sound sample. For example, new statistical data of the speaker model 330 may be calculated based on the new sound sample and the previous statistical data. If an existing sound sample was removed to make room for a new sound sample, new statistical data may be calculated based on the removed sound sample, the new sound sample, and the previous statistical data. In some embodiments, a new sound sample may be weighted in proportional to the confidence value of the new sound sample.

Figure 10:
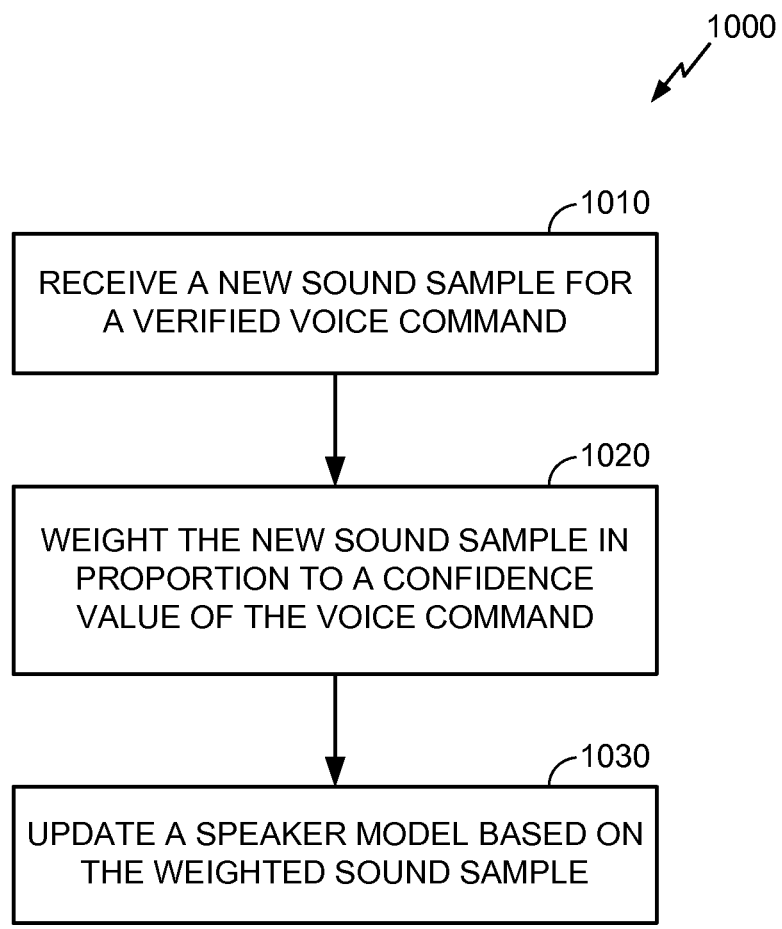
FIG. 10 shows a flow chart of a method for updating a speaker model based on a confidence value for a voice command, according to one embodiment of the present disclosure.

FIG. 10 shows a flow chart of a method 1000 for updating the speaker model 330 based on a confidence value for a voice command, according to one embodiment of the present disclosure. The voice activation unit 254 verifies the voice command by determining the confidence value for the voice command. Once the voice command is verified, the voice activation unit 254 provides one or more sound features for the verified voice command as a new sound sample to the database updating unit 260.

As illustrated in FIG. 10, the database updating unit 260 receives the new sound sample for the verified voice command, at 1010. In addition, the database updating unit 260 also receives the confidence value for the verified voice command from the voice activation unit 254. The received new sound sample and confidence value are used in updating the speaker model 330. In this process, the new sound sample is weighted in proportional to the confidence value for the voice command, at 1020. The speaker model 330 is then updated based on the weighted new sound sample, at 1030.

Figure 11:
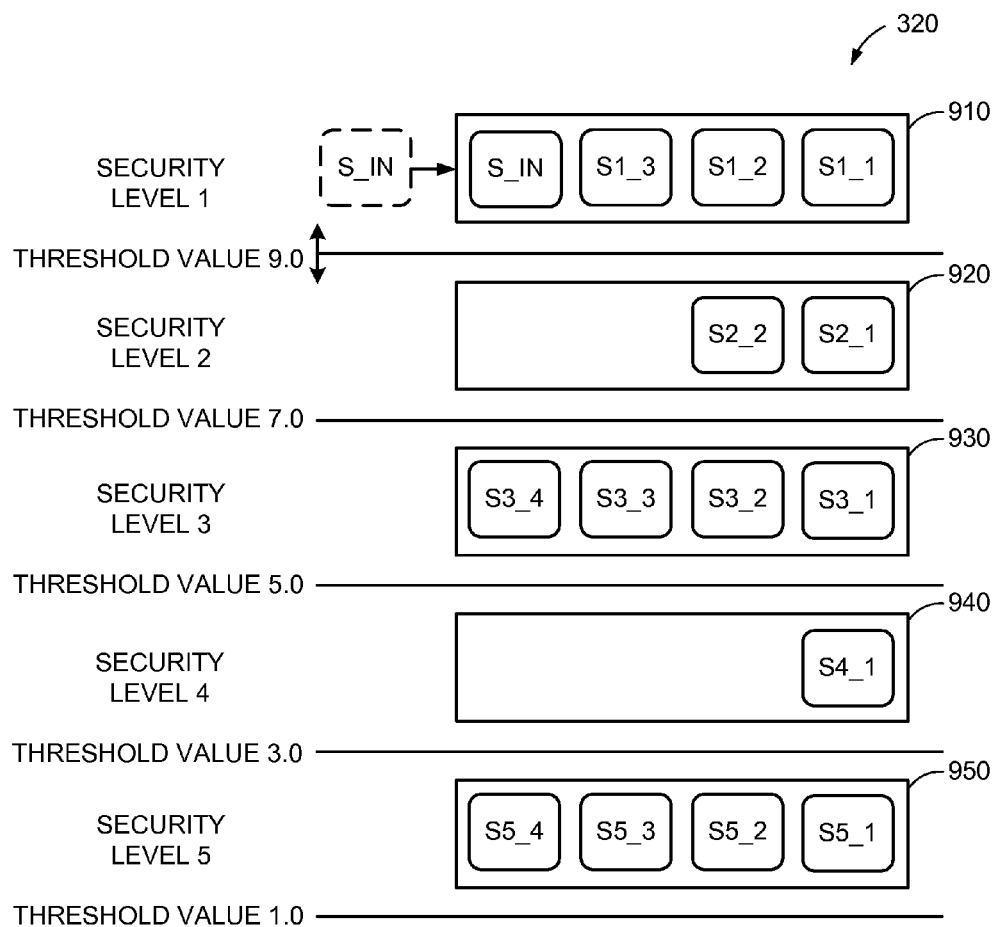
FIG. 11 illustrates a diagram of a speaker verification database of an electronic device in which a threshold value for a security level of a new sound sample is adjusted in response to receiving the new sound sample, according to one embodiment of the present disclosure.

FIG. 11 illustrates a diagram of the speaker verification database 320 in which a threshold value for a security level of a new sound sample S_IN is adjusted in response to receiving the new sound sample S_IN, according to one embodiment of the present disclosure. In this embodiment, the new sound sample S_IN is added to the sound sample group 910 associated with the security level "1" according to its confidence value to update the speaker verification database 320. As described above, the speaker model 330 may then be updated based on the new sound sample S_IN in the speaker verification database 320.

After the speaker model 330 is updated, the database updating unit 260 updates a threshold value 9.0 associated with the sound sample group 910 for the security level "1"

that includes the new sound sample S_IN. In this case, the confidence values for the sound samples (e.g., S1_1, S1_2, S1_3, and S_IN) in the sound sample group 910 associated with the security level "1" are re-calculated using the updated speaker model 330. A minimum confidence value among the re-calculated confidence values may then be selected as a new threshold value for the security level "1." Thus, if the previously set threshold value of 9.0 for the security level "1" is different from the minimum confidence value, the threshold value may be adjusted to the minimum confidence value as indicated by an arrow in FIG. 11.

Figure 12:
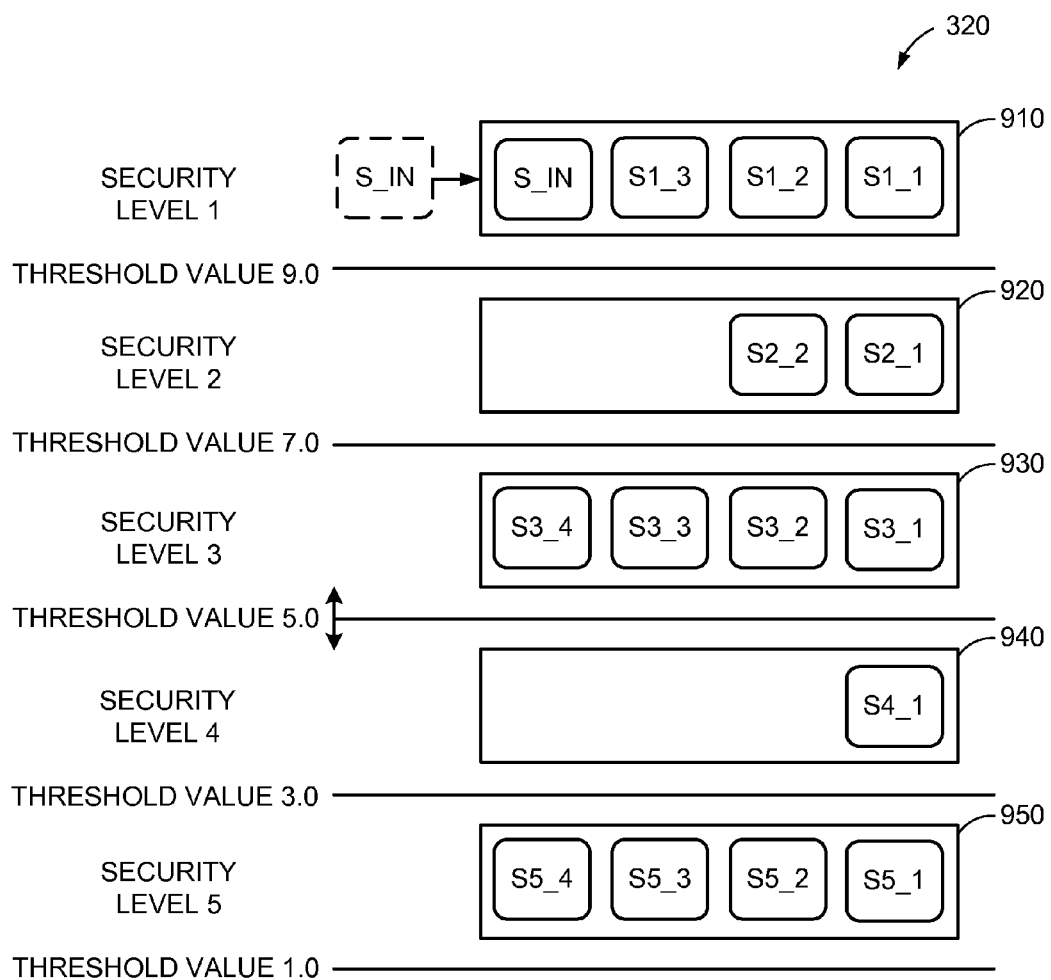
FIG. 12 illustrates a diagram of s speaker verification database of an electronic device in which a threshold value for a security level, which is different from a security level of a new sound sample, is adjusted in response to receiving the new sound sample, according to one embodiment of the present disclosure.

FIG. 12 illustrates a diagram of the speaker verification database 320 in which a threshold value for a security level, which is different from a security level of a new sound sample S_IN, is adjusted in response to receiving the new sound sample S_IN, according to one embodiment of the present disclosure. Similar to FIG. 11, the new sound sample S_IN is added to the sound sample group 910 associated with the security level "1" according to its confidence value to update the speaker verification database 320. Also, the speaker model 330 may be updated based on the new sound sample S_IN in the speaker verification database 320.

In the illustrated embodiment, the database updating unit 260 receives a security level associated with an application associated with a verified voice command from the voice activation unit 254. In this example, the security level associated with the application is assumed to be the security level "3." Thus, the database updating unit 260 updates a threshold value 5.0 associated with the sound sample group 930 for the security level "3." In this case, the confidence values for the sound samples (e.g., S3_1, S3_2, S3_3, and S3_4) in the sound sample group 930 associated with the security level "3" are re-calculated using the updated speaker model 330. A minimum confidence value among the re-calculated confidence values may then be selected as a new threshold value for the security level "3." Thus, if the previously set threshold value of 5.0 for the security level "3" is different from the minimum confidence value, the threshold value may be adjusted to the minimum confidence value as indicated by an arrow in FIG. 12.

Figure 13:
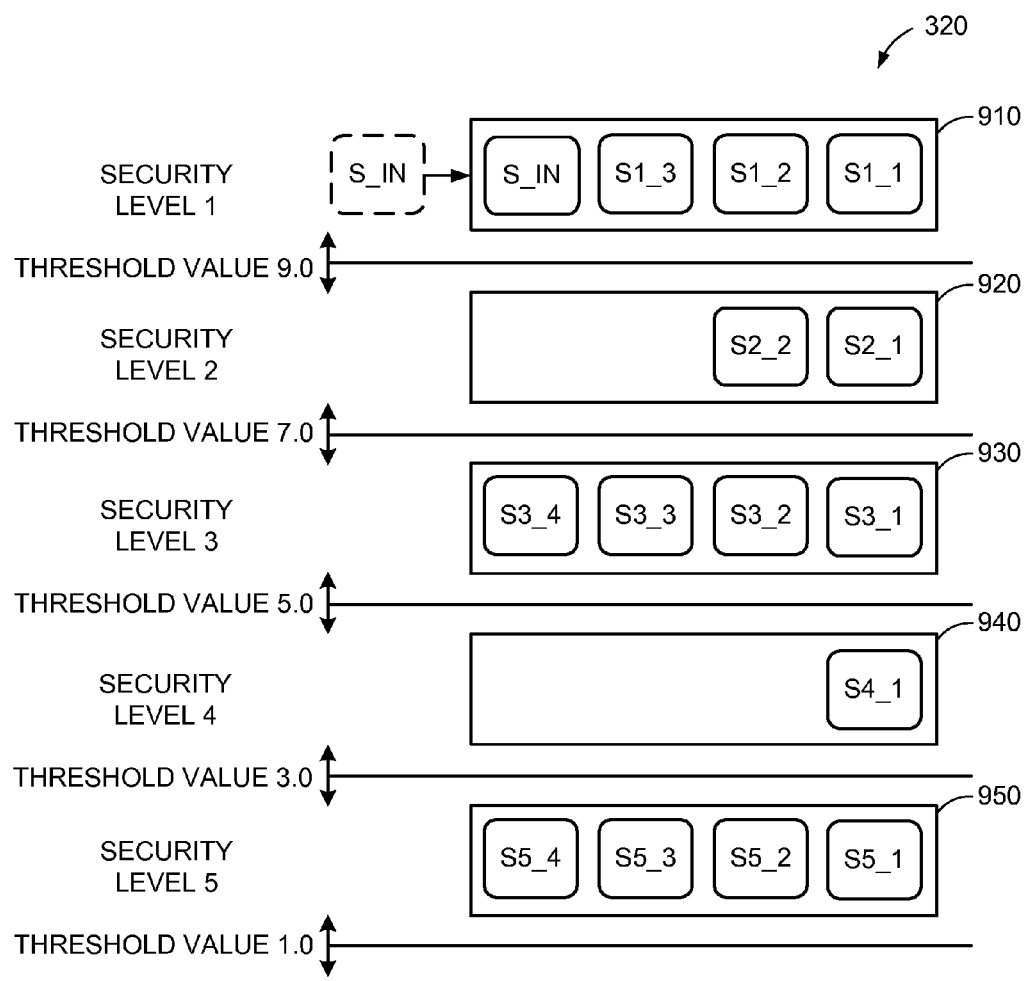
FIG. 13 illustrates a diagram of a speaker verification database of an electronic device in which threshold values for security levels are adjusted in response to receiving a new sound sample, according to one embodiment of the present disclosure.

FIG. 13 illustrates a diagram of the speaker verification database 320 in which threshold values for security levels are adjusted in response to receiving a new sound sample S_IN, according to one embodiment of the present disclosure. Similar to FIG. 11, the new sound sample S_IN is added to the sound sample group 910 associated with the security level "1" according to its confidence value to update the speaker verification database 320. Also, the speaker model 330 may be updated based on the new sound sample S_IN in the speaker verification database 320.

With the updated speaker model, the database updating unit 260 updates the threshold values (e.g., 9.0, 7.0, 5.0, 3.0, and 1.0) associated with the sound sample groups 910, 920, 930, 940, and 950 for the security levels "1" to "5." In this case, the confidence values for the sound samples in the sound sample group 910 (e.g., S1_1, S1_2, S1_3, and S_IN), the sound sample group 920 (e.g., S2_1 and S2_2), the sound sample group 930 (e.g., S3_1, S3_2, S3_3, and S3_4), the sound sample group 940 (e.g., S4_1), and the sound sample group 950 (e.g., S5_1, S5_2, S5_3, and S5_4) are re-calculated based on the updated speaker model 330. A minimum confidence value is selected among the re-calculated confidence values for the sound samples in each of the sound sample groups 910, 920, 930, 940, and 950, and the selected minimum confidence values are determined to be new threshold values for the security levels "1" to "5," respectively. Thus, the threshold values for the security levels "1" to "5" may be adjusted to reflect any new minimum confidence values for the security levels "1" to "5" as indicated by arrows in FIG. 13.

In another embodiment, the speaker verification database 320 may include a sound sample group with all previously verified voice commands as sound samples. When a new sound sample is received and verified, the new sound sample is added to the sound sample group. As discussed above, the speaker model 330 may be updated based on the new sound sample in the speaker verification database 320.

Based on the updated speaker model 330, confidence values for all of the sound samples in the sound sample group including the new sound sample may be determined A lowest confidence value and a highest confidence value may be selected among the confidence values, and the lowest value may be determined to be the threshold value for the lowest security level (e.g., security level "5"). A difference between the highest confidence value and the lowest confidence value may then be partitioned into a plurality of ranges with each range having a lower limit. In some embodiments, the difference may be divided by the number of the security levels to calculate a threshold value increment. The lower limits may then be assigned as threshold values for the security levels (e.g., security levels "1," "2," "3," and "4").

Figure 14:
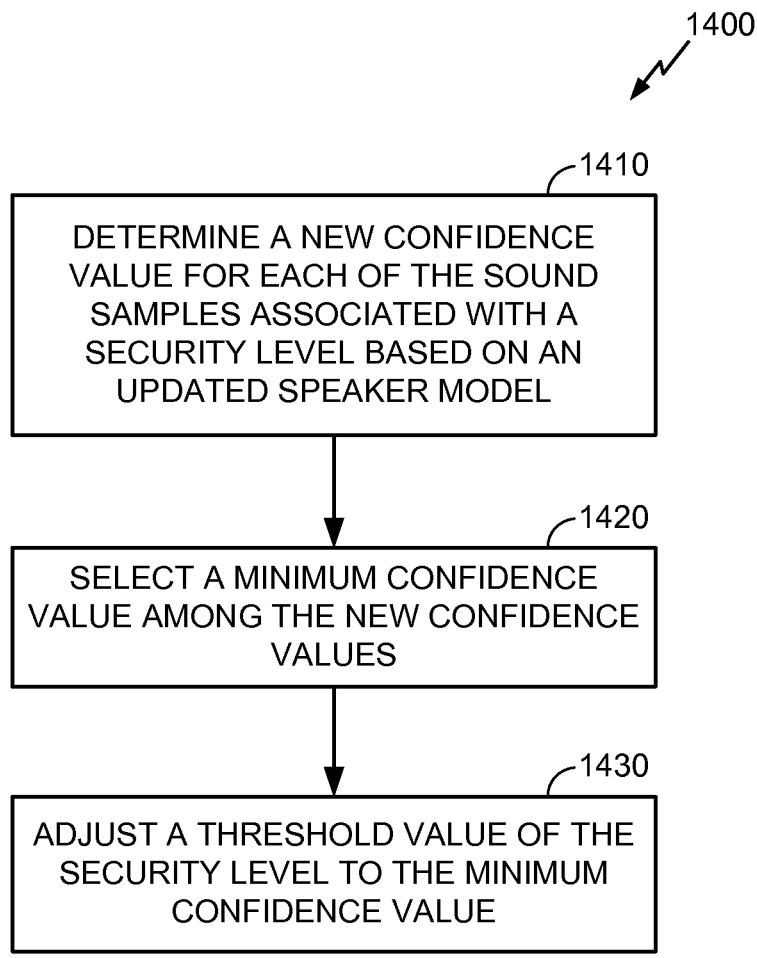
FIG. 14 illustrates a flow chart of a method for adjusting at least one of threshold values for security levels, according to one embodiment of the present disclosure.

FIG. 14 illustrates a flow chart of a method 1400 for adjusting a plurality of threshold values for a plurality of security levels, according to one embodiment of the present disclosure. After a voice command is verified, the database updating unit 260 receives a new sound sample for the verified voice command. The new sound sample then is added to a sound sample group associated with a security level according to its confidence value, and the speaker model 330 is updated based on the new sound sample.

A new confidence value for each of the sound samples associated with a security level selected among the plurality of security levels is then determined based on the updated speaker model 330, at 1410. In one embodiment, the security level is selected according to a confidence value of the new sound sample. In another embodiment, a security level mapped to an application of the voice command is selected among the plurality of security levels. Alternatively, the database updating unit 260 may determine new confidence values of sound samples for all security levels without selecting a security level.

Among the new confidence values for the sound samples associated with the selected security level, a minimum confidence value is selected, at 1420. The previous threshold value of the selected security level is then adjusted to the minimum confidence value, at 1430. In the case of determining the new confidence values for all security levels, minimum confidence value is selected among the new confidence values for each of the security levels, and the selected minimum confidence values are determined to be new threshold values for the security levels, respectively.

Figure 15:
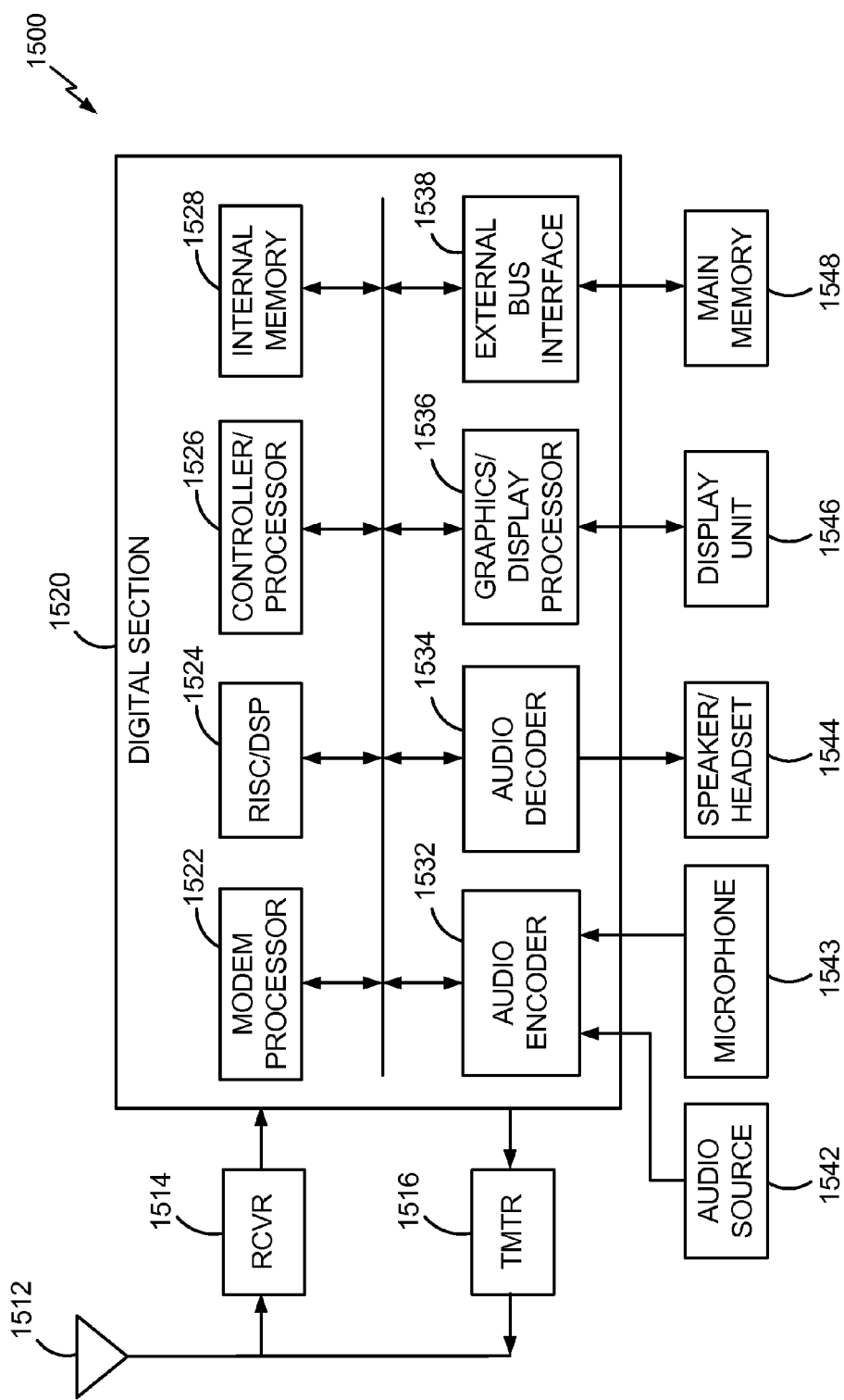
FIG. 15 is a block diagram of an exemplary mobile device in which the methods and apparatus for controlling access to applications may be implemented according to some embodiments of the present disclosure.

FIG. 15 is a block diagram of an exemplary mobile device 1500 in which the methods and apparatus for controlling access to applications may be implemented according to some embodiments of the present disclosure. The configuration of the mobile device 1500 may be implemented in the mobile devices according to the above embodiments described with reference to FIGS. 1 to 14. The mobile device 1500 may be a cellular phone, a smartphone, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Tern Evolution (LTE) system, LTE Advanced system, etc. Further, the mobile device 1500 may communicate directly with another mobile device, e.g., using Wi-Fi Direct, Bluetooth, or FlashLinq technology.

The mobile device 1500 is capable of providing bidirectional communication via a receive path and a transmit path. On the receive path, signals transmitted by base stations are received by an antenna 1512 and are provided to a receiver (RCVR) 1514. The receiver 1514 conditions and digitizes the received signal and provides samples such as the conditioned and digitized digital signal to a digital section for further processing. On the transmit path, a transmitter (TMTR) 1516 receives data to be transmitted from a digital section 1520, processes and conditions the data, and generates a modulated signal, which is transmitted via the antenna 1512 to the base stations. The receiver 1514 and the transmitter 1516 may be part of a transceiver that may support CDMA, GSM, LTE, LTE Advanced, etc.

The digital section 1520 includes various processing, interface, and memory units such as, for example, a modem processor 1522, a reduced instruction set computer/digital signal processor (RISC/DSP) 1524, a controller/processor 1526, an internal memory 1528, a generalized audio encoder 1532, a generalized audio decoder 1534, a graphics/display processor 1536, and an external bus interface (EBI) 1538. The modem processor 1522 may perform processing for data transmission and reception, e.g., encoding, modulation, demodulation, and decoding. The RISC/DSP 1524 may perform general and specialized processing for the mobile device 1500. The controller/processor 1526 may perform the operation of various processing and interface units within the digital section 1520. The internal memory 1528 may store data and/or instructions for various units within the digital section 1520.

The generalized audio encoder 1532 may perform encoding for input signals from an audio source 1542, a microphone 1543, etc. The generalized audio decoder 1534 may perform decoding for coded audio data and may provide output signals to a function determining engine 1544. The graphics/display processor 1536 may perform processing for graphics, videos, images, and texts, which may be presented to a display unit 1546. The EBI 1538 may facilitate transfer of data between the digital section 1520 and a database 1548.

The digital section 1520 may be implemented with one or more processors, DSPs, microprocessors, RISCs, etc. The digital section 1520 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for controlling access to a plurality of applications in an electronic device, the method comprising:
   receiving a voice command from a speaker for accessing a target application among the plurality of applications, at least two of the plurality of applications associated with different security levels having different threshold values;
   controlling access to one or more of the plurality of applications by verifying whether the voice command is indicative of an authorized user based on a speaker model of the authorized user; and
   in response to verifying that the voice command is indicative of the authorized user, updating the speaker model based on the voice command and adjusting at least one of the threshold values based on the updated speaker model.

2. The method of claim 1, further comprising:
   receiving a new voice command for accessing a new target application among the plurality of applications; and
   verifying whether the new voice command is indicative of the authorized user based on the updated speaker model.

3. The method of claim 1, wherein verifying whether the voice command is indicative of the authorized user comprises:
   determining a confidence value of the voice command based on the speaker model; and
   accessing the target application if the confidence value of the voice command exceeds a threshold value for a security level of the target application.

4. The method of claim 3, wherein updating the speaker model comprises:
   weighting the voice command in proportion to the confidence value of the voice command; and
   updating the speaker model based on the weighted voice command.

5. The method of claim 1, wherein the speaker model comprises statistical data of at least one sound feature extracted from a plurality of sound samples of the authorized user.

6. The method of claim 5, wherein updating the speaker model comprises updating the statistical data with at least one sound feature extracted from the voice command.

7. The method of claim 1, wherein adjusting the at least one of the threshold values comprises:
   determining a confidence value for each of at least one sound sample associated with a security level selected from security levels of the plurality of applications based on the updated speaker model; and
   adjusting the threshold value of the selected security level to a new threshold value based on the confidence value.

8. The method of claim 7, wherein the threshold value of the selected security level is adjusted to a lowest confidence value among the confidence values for the at least one sound sample.

9. The method of claim 7, wherein the selected security level is the security level associated with the target application.

10. The method of claim 7, wherein the selected security level is determined based on a confidence value of the voice command.

11. The method of claim 1, wherein adjusting the at least one of the threshold values comprises:
    determining confidence values for a plurality of sound samples based on the updated speaker model; and
    adjusting the threshold values to new threshold values based on the confidence values.

12. The method of claim 11, wherein adjusting the threshold values comprises:
    determining a lowest confidence value and a highest confidence value among the confidence values;
    partitioning a difference between the lowest and highest confidence values into a plurality of ranges associated with security levels of the plurality of applications, wherein each of the plurality of ranges includes a lower limit; and
    assigning the lower limits as the new threshold values for the security levels.

13. The method of claim 1, wherein each of the plurality of applications is associated with a security level having a threshold value, and wherein each of the security levels is associated with a set of sound samples having a confidence value greater than the threshold value for the security level.

14. The method of claim 13, further comprising adding the voice command to one of the sets of sound samples for a security level selected based on a confidence value of the voice command.

15. The method of claim 1, further comprising if the voice command is not verified to be indicative of the authorized user, authenticating the voice command to be indicative of the authorized user based on an input from the speaker.

16. The method of claim 15, wherein the input from the speaker includes at least one of an image of a face, a fingerprint, a personal identification number, or an additional voice command.

17. An electronic device for controlling access to a plurality of applications, the electronic device comprising:
    a sound sensor configured to receive a voice command from a speaker for accessing a target application among the plurality of applications;
    a storage unit configured to store the plurality of applications, a plurality of security levels, a plurality of threshold values, and a speaker model of an authorized user, at least two of the plurality of applications associated with a different security levels of the plurality of security levels, the different security levels having different threshold values of the plurality of threshold values;
    a speaker verification unit configured to control access to one or more of the plurality of applications by verifying whether the voice command is indicative of the authorized user based on the speaker model of the authorized user; and
    a database updating unit configured to update the speaker model based on the voice command in response to verifying that the voice command is indicative of the authorized user and to adjust at least one of the threshold values based on the updated speaker model.

18. The electronic device of claim 17, wherein:
the sound sensor is further configured to receive a new voice command for accessing a new target application among the plurality of applications, and
the speaker verification unit is further configured to verify whether the new voice command is indicative of the authorized user based on the updated speaker model.

19. The electronic device of claim 17, wherein the speaker verification unit is further configured to determine a confidence value of the voice command based on the speaker model and to access the target application if the confidence value of the voice command exceeds the threshold value for the security level of the target application.

20. The electronic device of claim 19, wherein the database updating unit is further configured to weight the voice command in proportion to the confidence value of the voice command and to update the speaker model based on the weighted voice command.

21. The electronic device of claim 17, wherein the speaker model comprises statistical data of at least one sound feature extracted from a plurality of sound samples of the authorized user.

22. The electronic device of claim 21, wherein the database updating unit is further configured to update the statistical data with at least one sound feature extracted from the voice command.

23. The electronic device of claim 17, wherein the database updating unit is further configured to determine a confidence value for each of at least one sound sample associated with a security level selected from the security levels based on the updated speaker model and to adjust the threshold value of the selected security level to a new threshold value based on the confidence value.

24. The electronic device of claim 23, wherein the threshold value of the selected security level is adjusted to a lowest confidence value among the confidence values for the at least one sound sample.

25. The electronic device of claim 23, wherein the selected security level is the security level associated with the target application.

26. The electronic device of claim 23, wherein the selected security level is determined based on a confidence value of the voice command.

27. The electronic device of claim 17, wherein the database updating unit is further configured to determine confidence values for a plurality of sound samples based on the updated speaker model and to adjust the threshold values to new threshold values based on the confidence values.

28. The electronic device of claim 27, wherein:
the database updating unit is further configured to determine a lowest confidence value and a highest confidence value among the confidence values and to partition a difference between the lowest and highest confidence values into a plurality of ranges associated with the security levels,
each of the plurality of ranges includes a lower limit, and the database updating unit is further configured to assign the lower limits as the new threshold values for the security levels.

29. The electronic device of claim 17, wherein each of the security levels is associated with a set of sound samples having a confidence value greater than the threshold value for the security level.

30. The electronic device of claim 29, wherein the database updating unit is further configured to add the voice command to one of the sets of sound samples for a security level selected based on a confidence value of the voice command.

31. The electronic device of claim 17, wherein if the voice command is not verified to be indicative of the authorized user, the speaker verification unit is further configured to authenticate the voice command based on an input from the speaker.

32. The electronic device of claim 31, wherein the input from the speaker includes at least one of an image of a face, a fingerprint, a personal identification number, or an additional voice command.

33. An electronic device for controlling access to a plurality of applications, the electronic device comprising:
means for receiving a voice command from a speaker for accessing a target application among the plurality of applications;
means for storing the plurality of applications, a plurality of security levels, a plurality of threshold values, and a speaker model of an authorized user, at least two of the plurality of applications associated with a different security levels of the plurality of security levels, the different security levels having different threshold values of the plurality of threshold values;
means for controlling access to one or more of the plurality of applications by verifying whether the voice command is indicative of the authorized user based on the speaker model of the authorized user;
means for updating the speaker model with based on the voice command if in response to the voice command being verified to be indicative of the authorized user; and
means for adjusting at least one of the threshold values based on the updated speaker model.

34. The electronic device of claim 33, wherein:
the means for receiving is configured to receive a new voice command for accessing a new target application among the plurality of applications, and
the means for controlling access by verifying is configured to verify whether the new voice command is indicative of the authorized user based on the updated speaker model.

35. The electronic device of claim 33, wherein the means for controlling access by verifying is configured to determine a confidence value of the voice command based on the speaker model and to access the target application if the confidence value of the voice command exceeds the threshold value for the security level of the target application.

36. The electronic device of claim 35, wherein the means for updating is configured to weight the voice command in proportion to the confidence value of the voice command and to update the speaker model based on the weighted voice command.

37. The electronic device of claim 33, wherein the means for updating is configured to determine a confidence value for each of at least one sound sample associated with a security level selected from the security levels based on the updated speaker model and to adjust the threshold value of the selected security level to a new threshold value based on the confidence value.

38. The electronic device of claim 37, wherein the threshold value of the selected security level is adjusted to a lowest confidence value among the confidence values for the at least one sound sample.

39. The electronic device of claim 37, wherein the selected security level is the security level associated with the target application.

40. The electronic device of claim 37, wherein the selected security level is determined based on a confidence value of the voice command.

41. The electronic device of claim 33, wherein the means for updating is further configured to determine confidence values for a plurality of sound samples based on the updated speaker model and to adjust the threshold values to new threshold values based on the confidence values.

42. The electronic device of claim 41, wherein:
the means for updating is further configured to determine a lowest confidence value and a highest confidence value among the confidence values and to partition a difference between the lowest and highest confidence values into a plurality of ranges associated with the security levels,
each of the plurality of ranges includes a lower limit, and
the means for updating is further configured to assign the lower limits as the new threshold values for the security levels.

43. A non-transitory computer-readable storage medium comprising instructions for controlling access to a plurality of applications, the instructions causing a processor of an electronic device to perform operations comprising:
receiving a voice command from a speaker for accessing a target application among the plurality of applications, at least two of the plurality of applications associated with a different security levels having different threshold values;
controlling access to one or more of the plurality of applications by verifying whether the voice command is indicative of an authorized user based on a speaker model of the authorized user; and
in response to verifying that the voice command is indicative of the authorized user, updating the speaker model based on the voice command and adjusting at least one of the threshold values based on the updated speaker model.

44. The storage medium of claim 43, wherein the instructions further comprise:
receiving a new voice command for accessing a new target application among the plurality of applications; and
verifying whether the new voice command is indicative of the authorized user based on the updated speaker model.

45. The storage medium of claim 43, wherein adjusting the at least one of the threshold values comprises:
determining a confidence value for each of at least one sound sample associated with a security level selected from security levels of the plurality of applications based on the updated speaker model; and
adjusting the threshold value of the selected security level to a new threshold value based on the confidence value.

46. The storage medium of claim 45, wherein if the at least one sound sample includes a plurality of sound samples, the threshold value of the selected security level is adjusted to a lowest confidence value among the confidence values for the plurality of sound samples.

47. The storage medium of claim 45, wherein the selected security level is the security level associated with the target application.

48. The storage medium of claim 45, wherein the selected security level is determined based on a confidence value of the voice command.

49. The storage medium of claim 43, wherein adjusting the at least one of the threshold values comprises:
determining confidence values for a plurality of sound samples based on the updated speaker model; and
adjusting the threshold values to new threshold values based on the confidence values.

50. The storage medium of claim 49, wherein adjusting the threshold values comprises:
determining a lowest confidence value and a highest confidence value among the confidence values;
partitioning a difference between the lowest and highest confidence values into a plurality of ranges associated with security levels of the plurality of applications, wherein each of the plurality of ranges includes a lower limit; and
assigning the lower limits as the new threshold values for the security levels.

* * * * *